Jan. 18, 1938.                F. A. KORN                2,105,921
                        NUMBER CHECKING SYSTEM
                         Filed March 11, 1936           38 Sheets-Sheet 1

FIG. 1

| FIG. 7 | FIG. 14 | FIG. 22 | FIG. 30 | FIG. 38 |
| FIG. 6 | FIG. 13 | FIG. 21 | FIG. 29 | FIG. 37 |
| FIG. 5 | FIG. 12 | FIG. 20 | FIG. 28 | FIG. 36 |
| FIG. 4 | FIG. 11 | FIG. 19 | FIG. 27 | FIG. 35 |
| FIG. 3 | FIG. 10 | FIG. 18 | FIG. 26 | FIG. 34 |
| FIG. 8 | FIG. 9 | FIG. 17 | FIG. 25 | FIG. 33 |
|        | FIG. 15 | FIG. 16 | FIG. 24 | FIG. 32 |
|        |         | FIG. 23 | FIG. 31 |         |

INVENTOR
F. A. KORN
BY P. C. Smith
ATTORNEY

Jan. 18, 1938.  F. A. KORN  2,105,921
NUMBER CHECKING SYSTEM
Filed March 11, 1936  38 Sheets-Sheet 16

INVENTOR
F. A. KORN
BY
P. C. Smith
ATTORNEY

Jan. 18, 1938.   F. A. KORN   2,105,921
NUMBER CHECKING SYSTEM
Filed March 11, 1936   38 Sheets-Sheet 21

INVENTOR
F. A. KORN
BY
P. C. Smith
ATTORNEY

Jan. 18, 1938.

F. A. KORN 2,105,921

NUMBER CHECKING SYSTEM

Filed March 11, 1936

INVENTOR
F. A. KORN
BY
P. C. Smith
ATTORNEY

Jan. 18, 1938.  F. A. KORN  2,105,921
NUMBER CHECKING SYSTEM
Filed March 11, 1936    38 Sheets-Sheet 23

INVENTOR
F. A. KORN
BY
P. C. Smith
ATTORNEY

Jan. 18, 1938. F. A. KORN 2,105,921
NUMBER CHECKING SYSTEM
Filed March 11, 1936 38 Sheets-Sheet 27

INVENTOR
F. A. KORN
BY P. C. Smith
ATTORNEY

Jan. 18, 1938.                F. A. KORN                 2,105,921
                        NUMBER CHECKING SYSTEM
                        Filed March 11, 1936         38 Sheets-Sheet 28

INVENTOR
F. A. KORN
BY P. C. Smith
ATTORNEY

Jan. 18, 1938.  F. A. KORN  2,105,921
NUMBER CHECKING SYSTEM
Filed March 11, 1936  38 Sheets-Sheet 29

Jan. 18, 1938. F. A. KORN 2,105,921
NUMBER CHECKING SYSTEM
Filed March 11, 1936 38 Sheets-Sheet 31

INVENTOR
F. A. KORN
BY
P. C. Smith
ATTORNEY

Jan. 18, 1938.  F. A. KORN  2,105,921
NUMBER CHECKING SYSTEM
Filed March 11, 1936     38 Sheets-Sheet 32

INVENTOR
F. A. KORN
BY
P. C. Smith
ATTORNEY

Jan. 18, 1938.                F. A. KORN                2,105,921
                        NUMBER CHECKING SYSTEM
                       Filed March 11, 1936        38 Sheets-Sheet 34

FIG. 34

INVENTOR
F. A. KORN
BY
P. C. Smith
ATTORNEY

Jan. 18, 1938.　　　　　F. A. KORN　　　　　2,105,921
NUMBER CHECKING SYSTEM
Filed March 11, 1936　　　38 Sheets-Sheet 36

INVENTOR
F. A. KORN
BY
P. C. Smith
ATTORNEY

Patented Jan. 18, 1938

2,105,921

UNITED STATES PATENT OFFICE 2,105,921

NUMBER CHECKING SYSTEM

Franklin A. Korn, Elizabeth, N. J., assignor to Bell Telephone Laboratories, Incorporated, New York, N. Y., a corporation of New York Application March 11, 1936, Serial No. 68,256

9 Claims. (Cl. 179—27)

This invention relates to telephone systems and has for its object to simplify the checking of calling subscribers' numbers in automatic telephone systems.

In automatic telephone systems calls to subscribers outside the local area are completed under the control of operators. Since the operator has no direct way of knowing whether the calling number as given by the calling subscriber is correct, special means have in the past been provided by which a second or checking circuit is built up to the line represented by the number given and a checking current applied to the sleeve or test terminal of the line which, if correct, returns over the original connection to the operator's position.

The present invention relates to cross-bar switching systems in which access to a called line is controlled by control equipment known as markers. In accordance with the present invention, the marker connects with the test terminal of the line and both applies and receives the checking current. In the case of groups of lines outgoing to a private branch exchange, the marker simultaneously applies current to the test terminal of each individual line of the group.

The present disclosure is a portion of a cross-bar system, such as shown on the patent to W. W. Carpenter, No. 2,089,921, granted Aug. 10, 1937.

The invention will be more clearly understood from consideration of the following description in connection with the accompanying drawings in which:

Fig. 1 shows the manner in which Figs. 3 to 38, inclusive, of the drawings are to be arranged;

Figure 8:
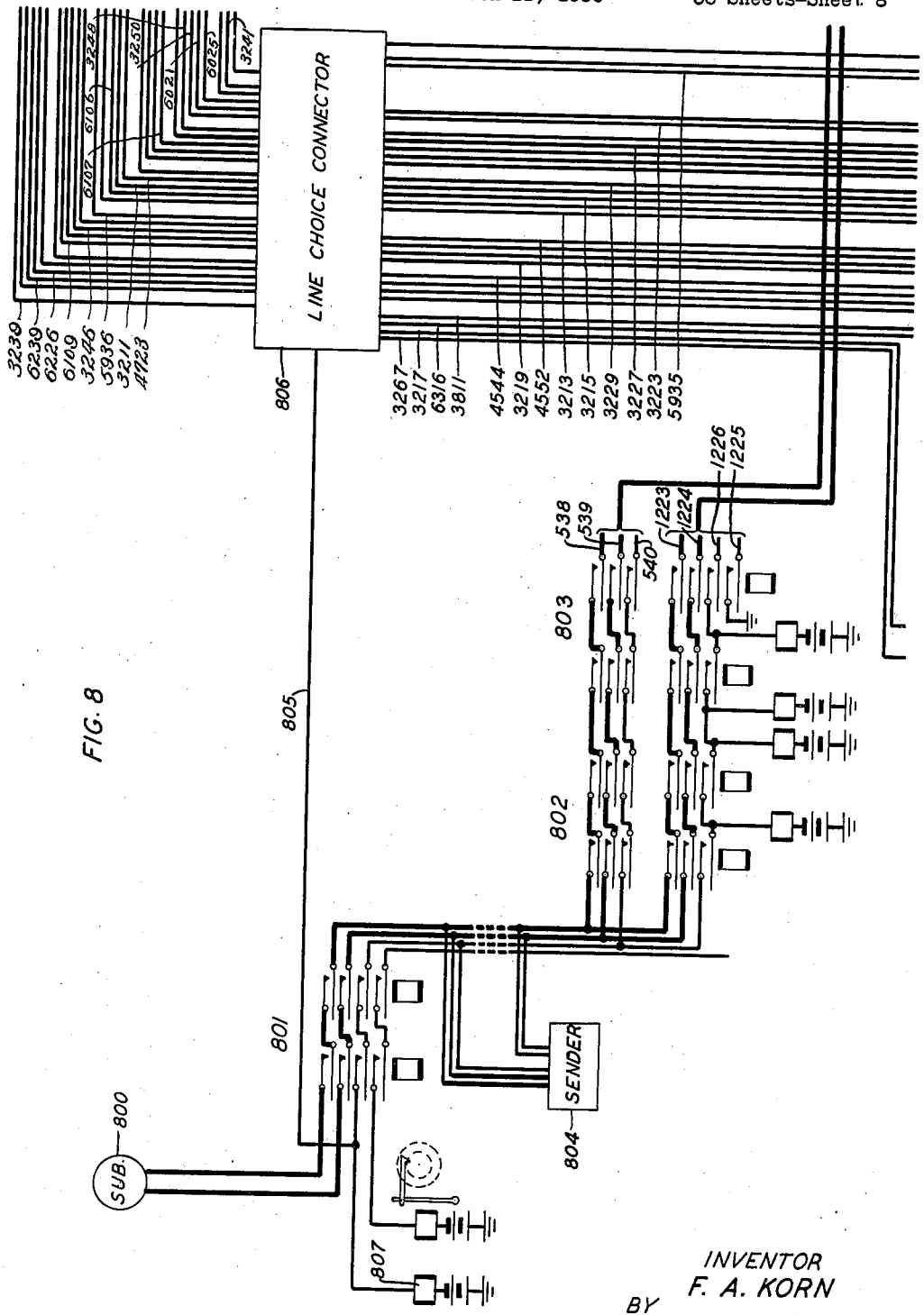
Figure 9:
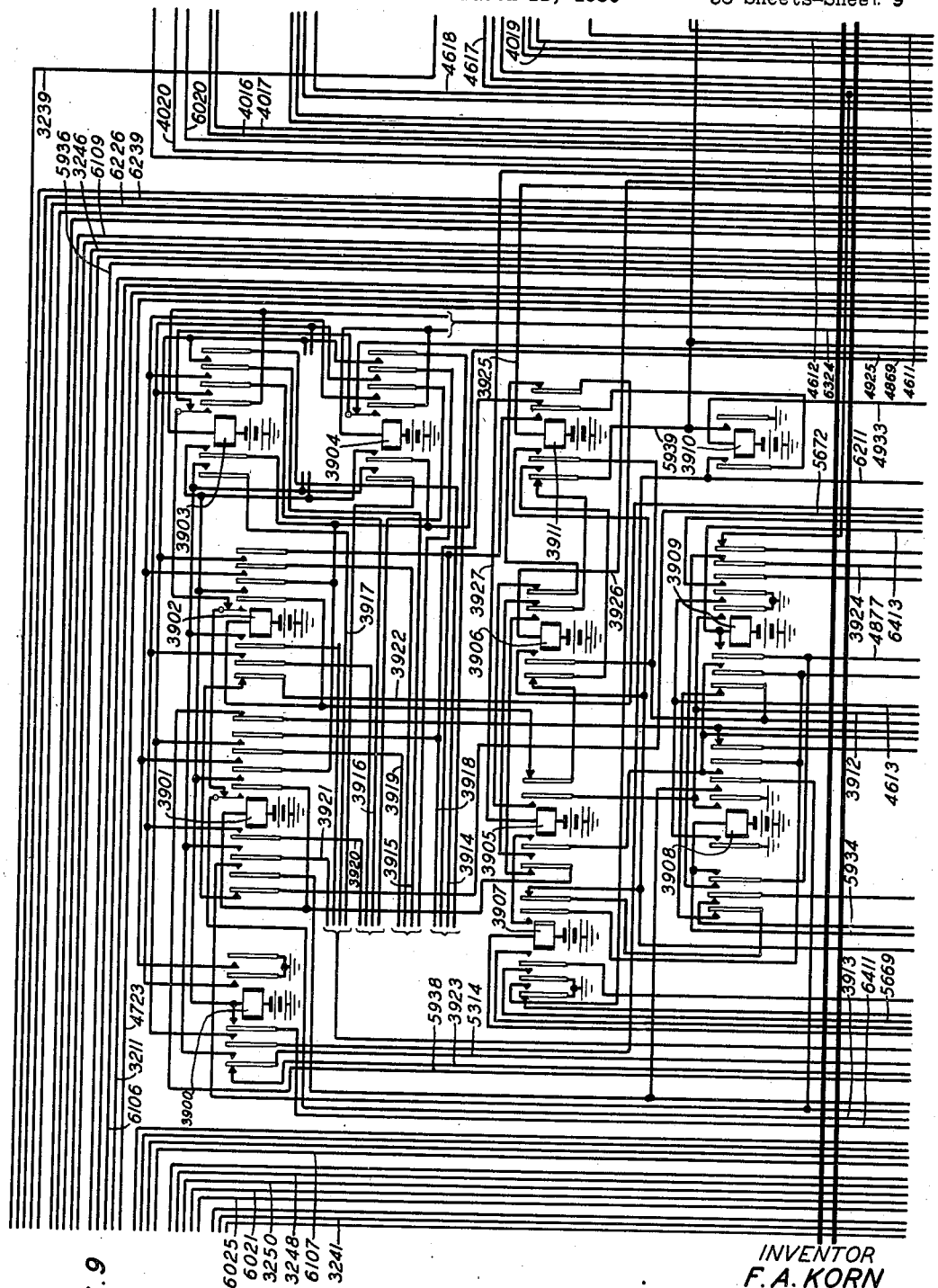
Figure 10:
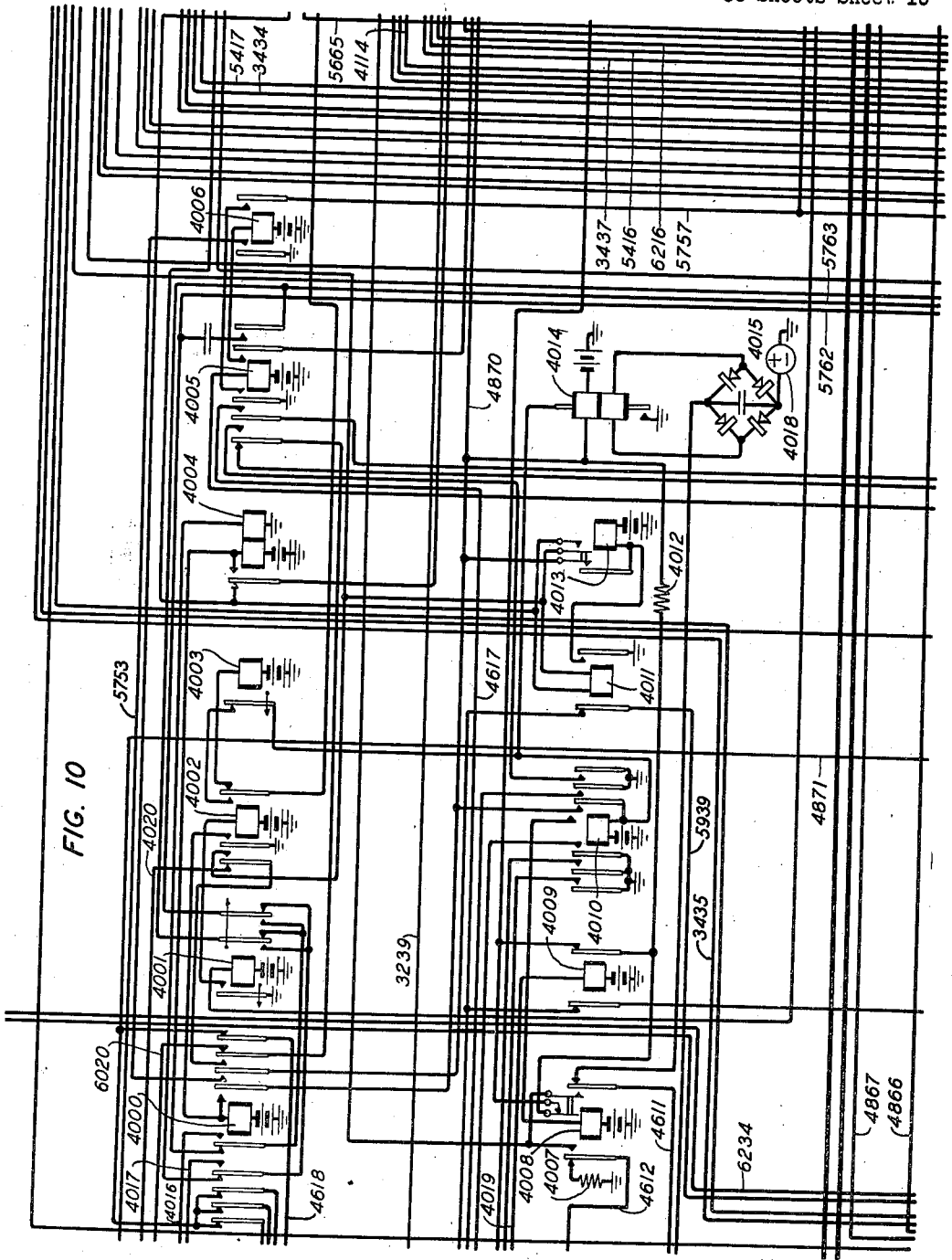
Figure 11:
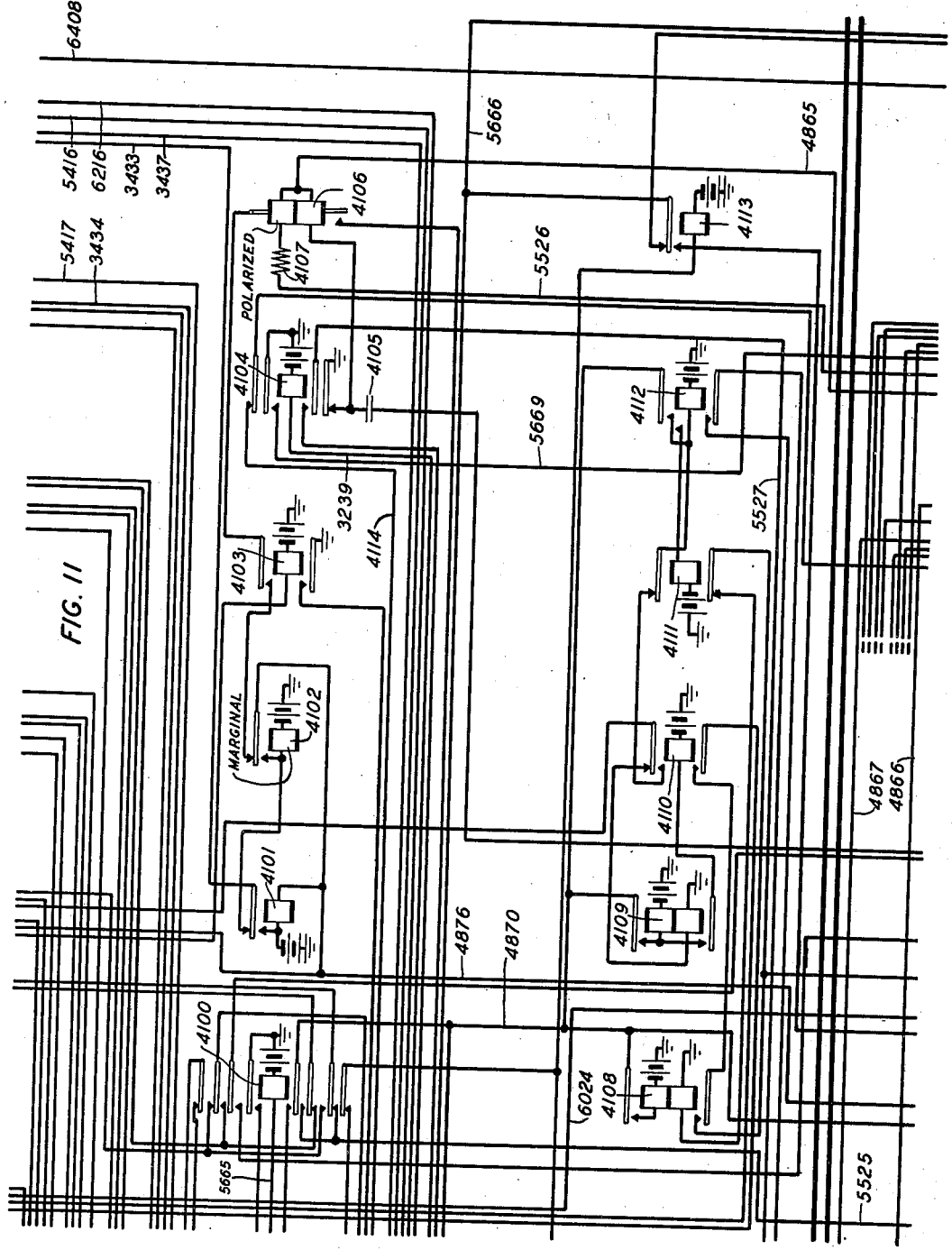
Figure 12:
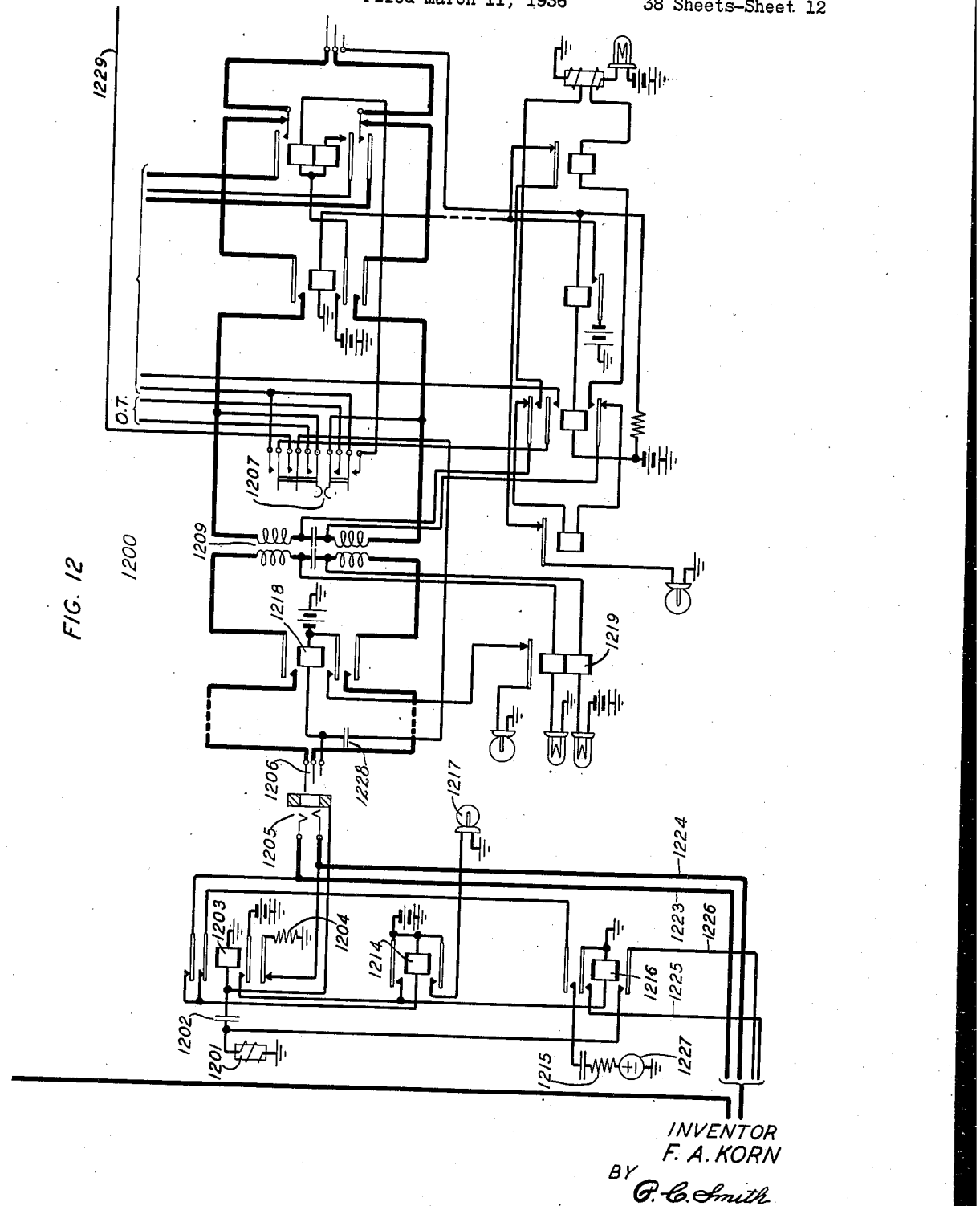
Figure 13:
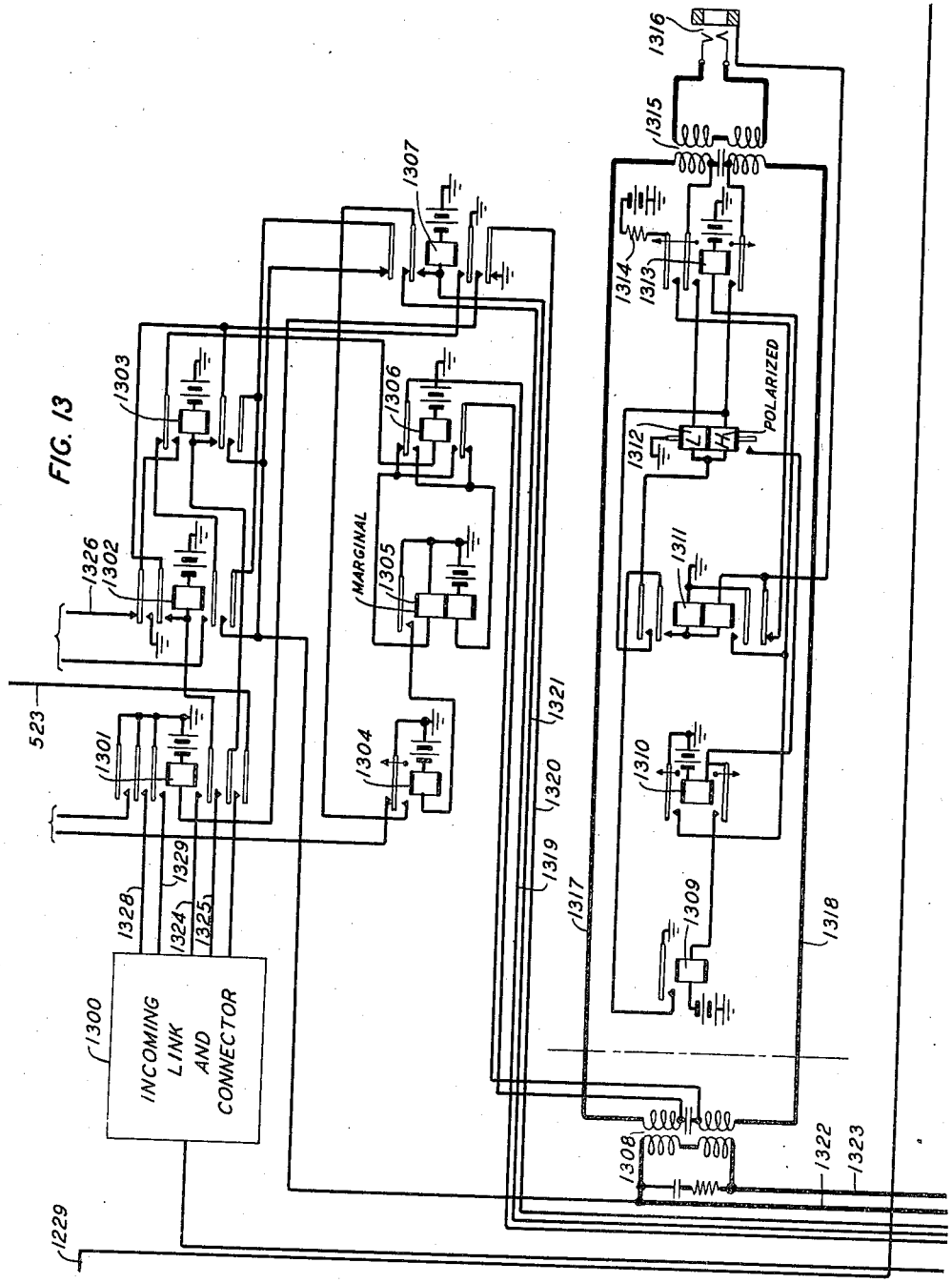
Figure 27:
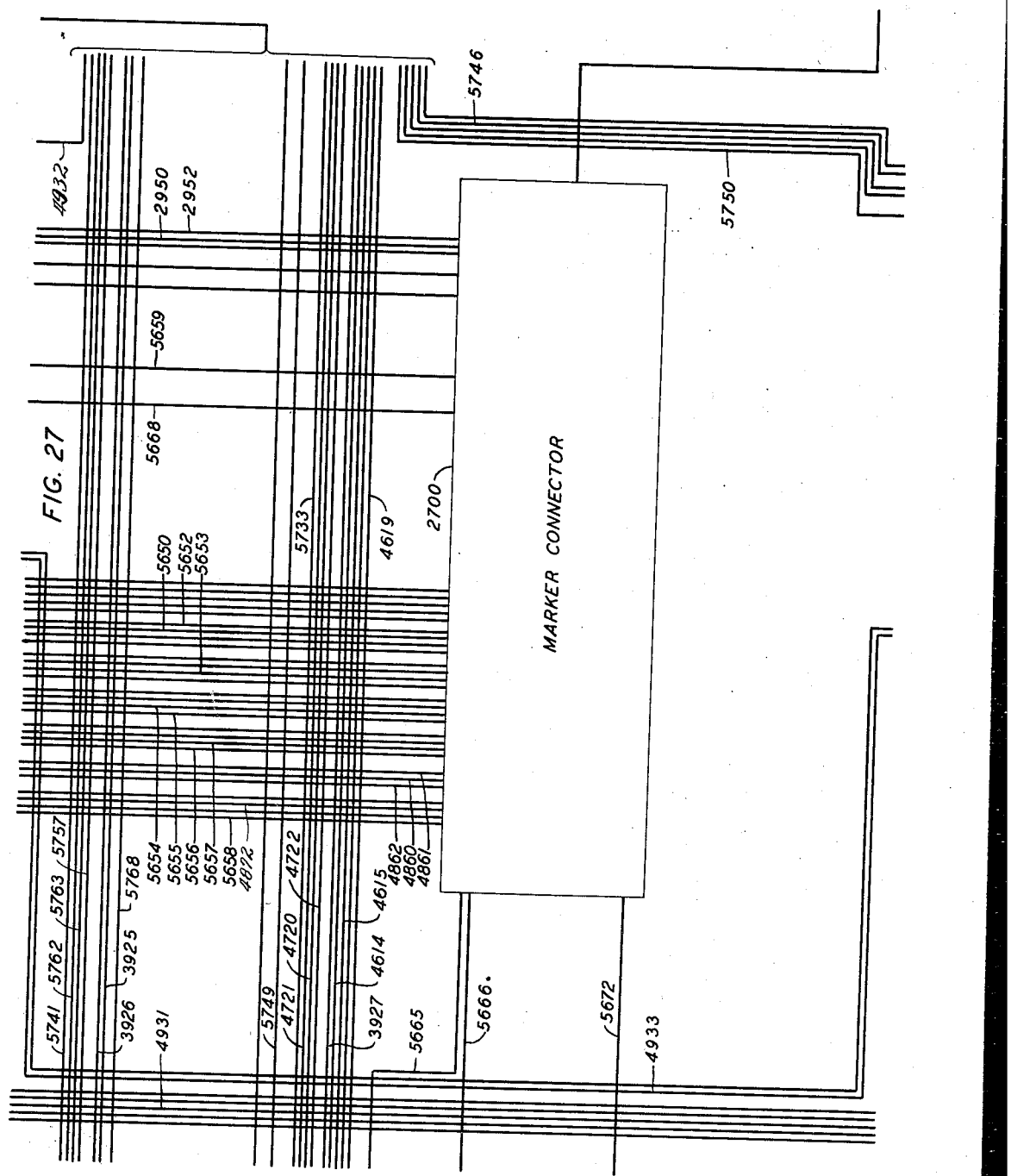
Figure 28:
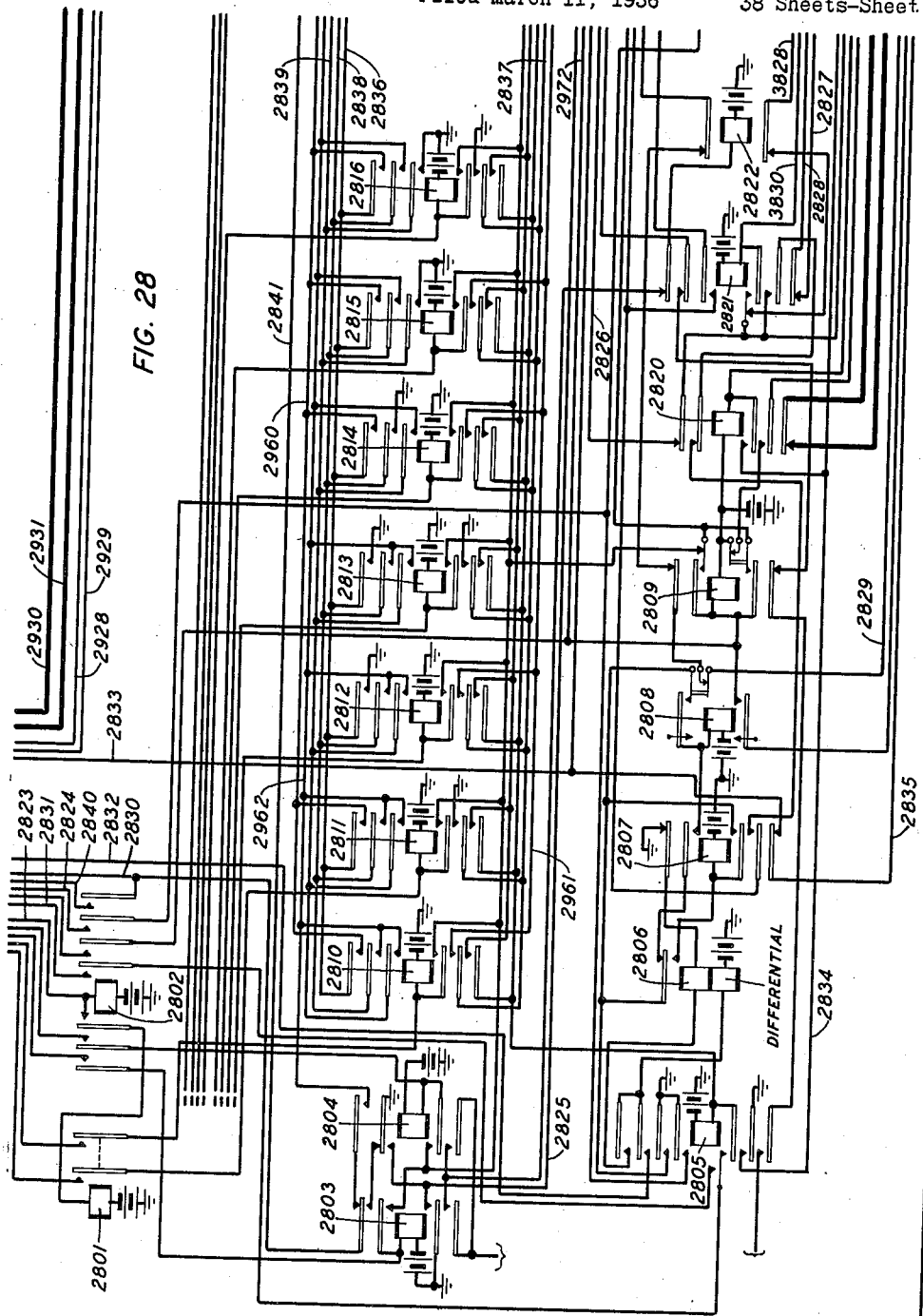
Figure 29:
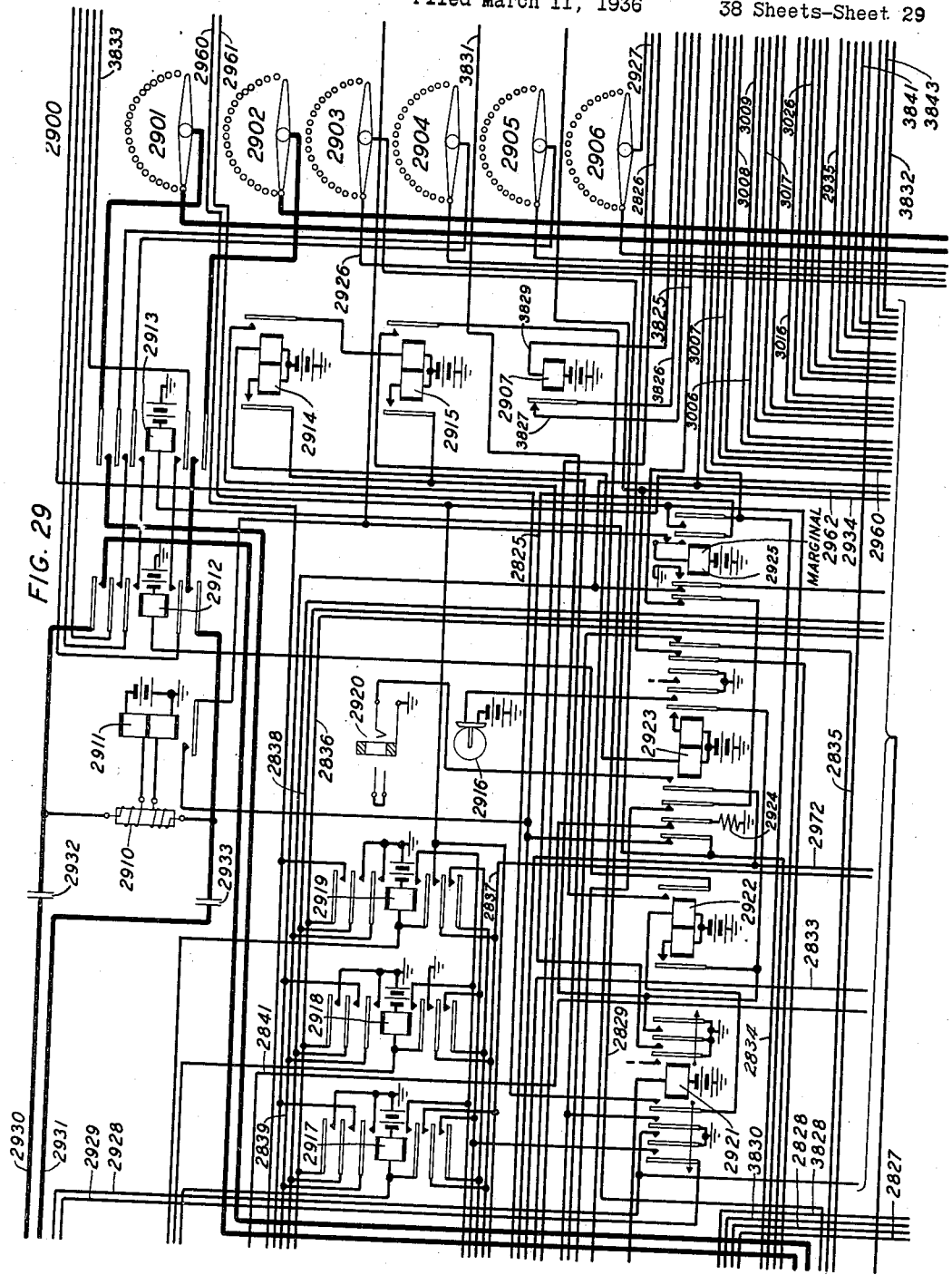
Figure 30:
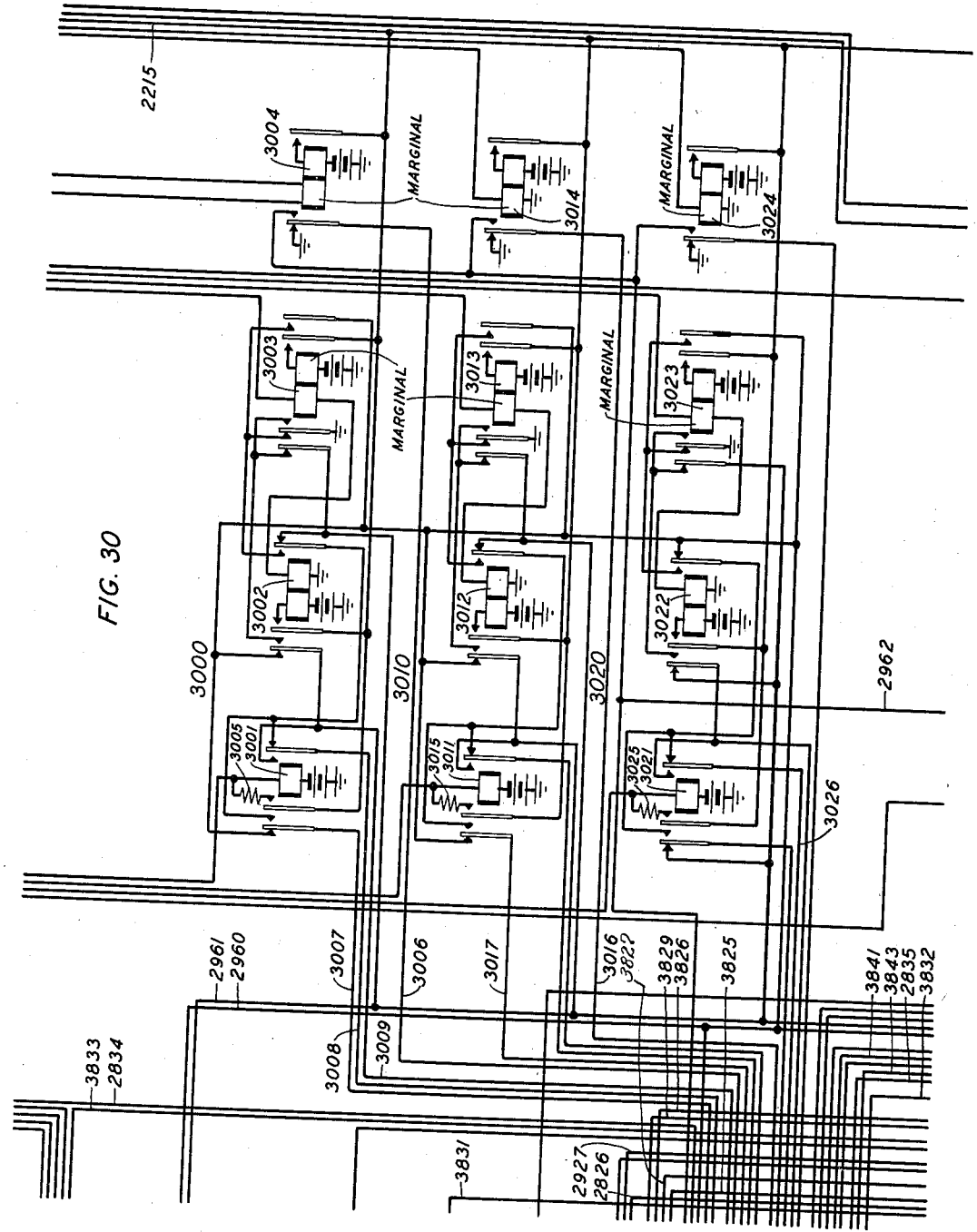
Figure 31:
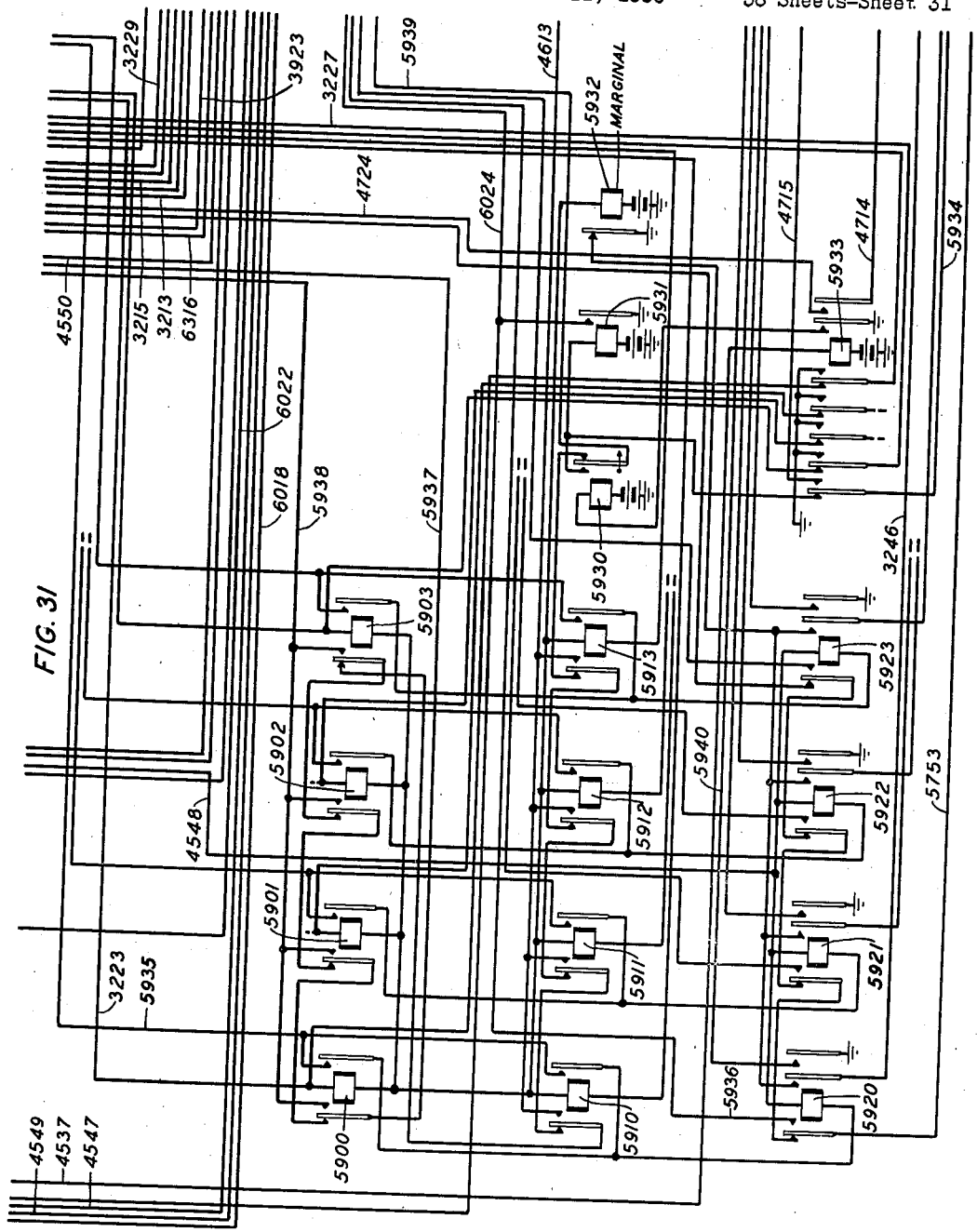
Figure 32:
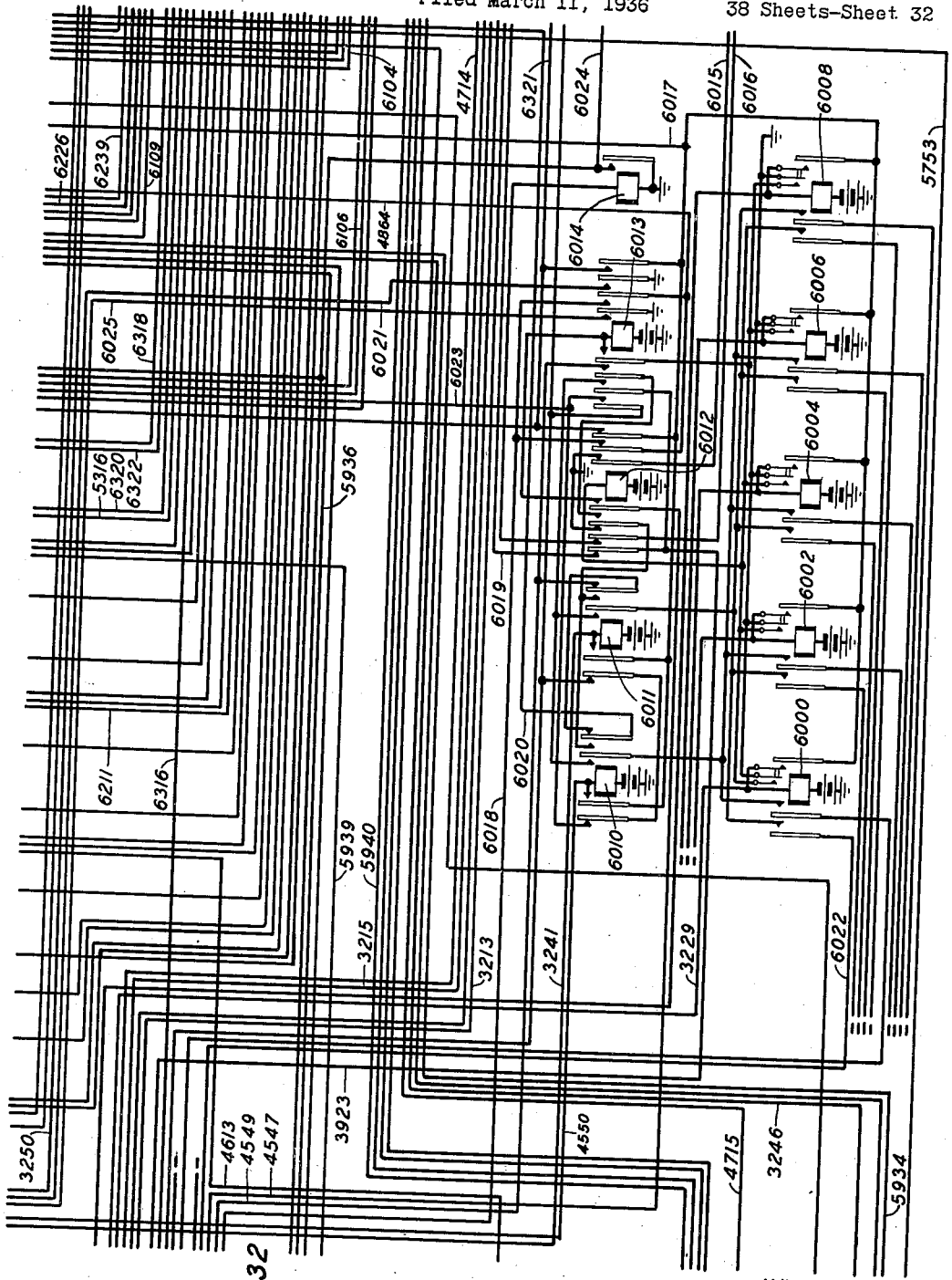
Figure 33:
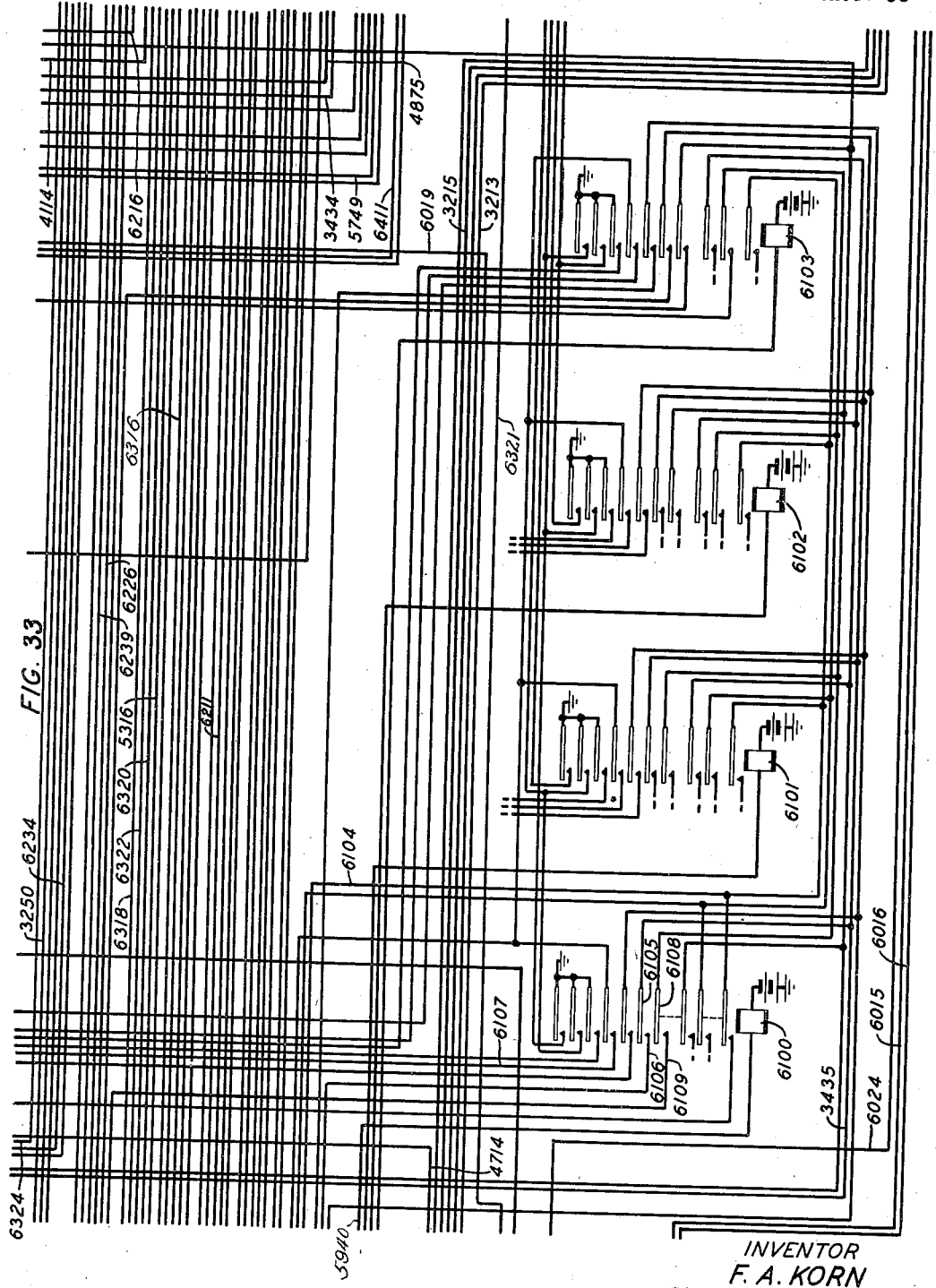
Figure 37:
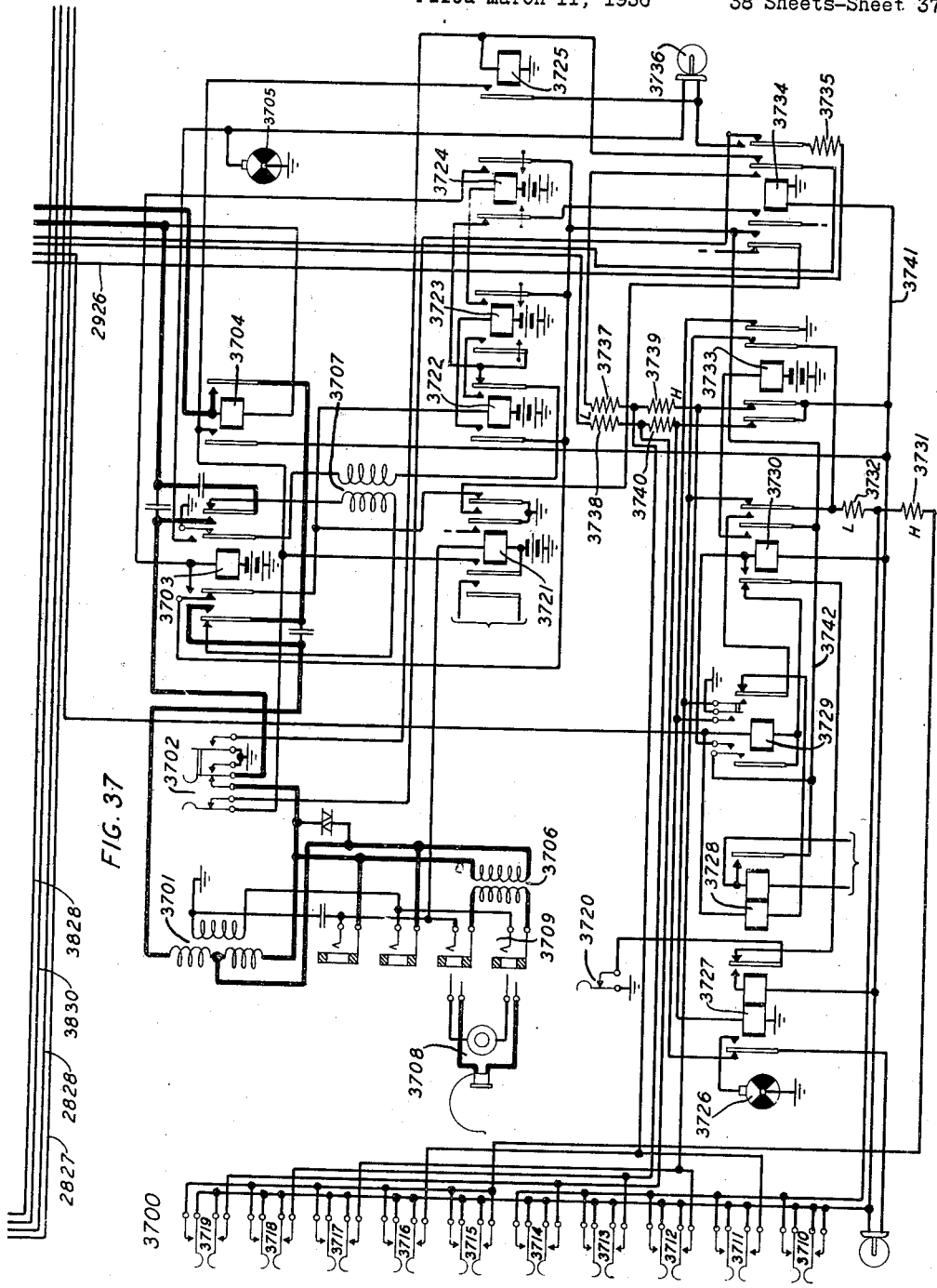
Figure 38:
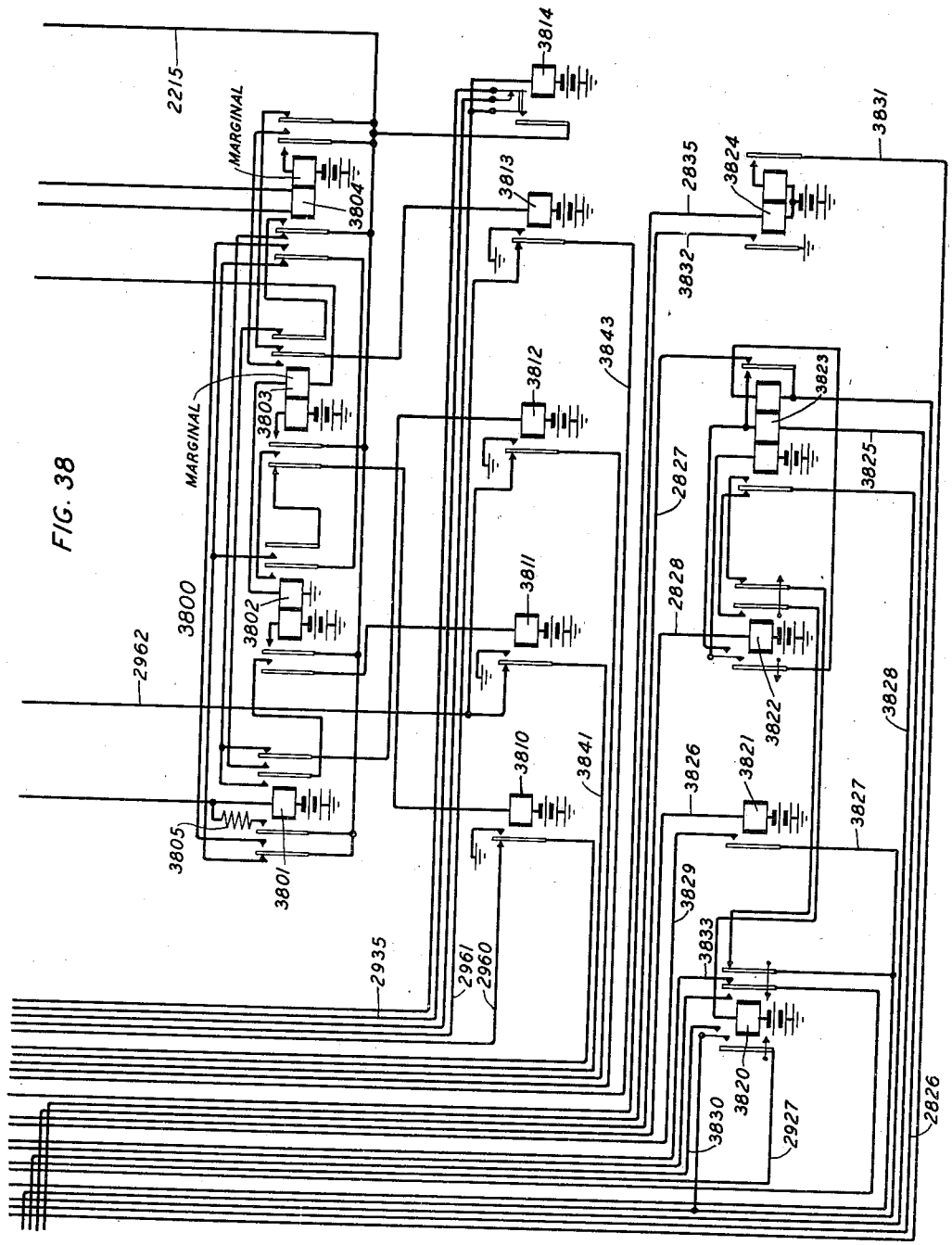

Figs. 3 to 38 show the details of the larger part of the system involved in number checking, Fig. 8 showing the subscriber's line, line, district and office links and the line choice connector; Figs. 12, 14, 20 and 21 showing the equipment leading to and located at the zero or "A" operator's position; Figs. 5, 6, 7 and 13 showing the equipment leading to and located at the toll operator's position; Figs. 22, 28, 29, 30 and 38 showing the "B" operator's sender; Fig. 37 showing the "B" operator's position circuit; Fig. 27 showing the marker connector in schematic form, and Figs. 3, 4, 9 to 11, 15 to 19, 23 to 26 and 31 to 36 showing the terminating marker.

Figs. 3, 4, 9 to 11, 15 to 19, 23 to 26 and 31 to 36 mentioned above as showing the terminating marker are copies of a portion of the drawing of the above-identified Carpenter patent, and correspond respectively to Figs. 33, 34, 39 to 41, 45 to 49, 52 to 55 and 59 to 64 of that drawing. For convenience in consulting the above patent the same reference characters have been used and reference is hereby made to the specification in that patent for details of the operation of the marker and such parts of the system as are not included in the present disclosure.

Figure 2:
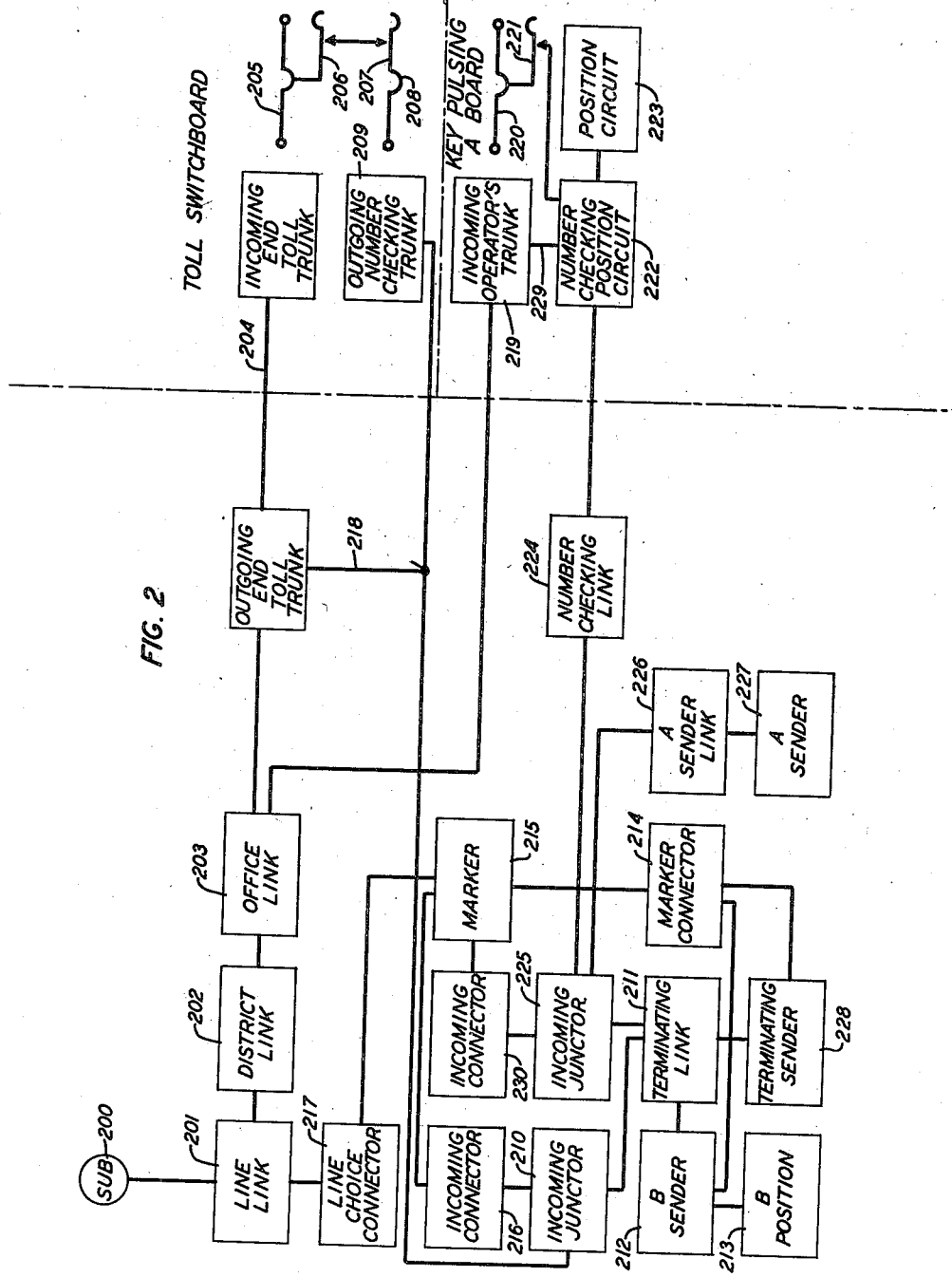
Fig. 2 is a diagrammatic showing of the equipment necessary to perform the number checking operation involving a toll operator and also one involving a zero or "A" operator.
Figure 3:
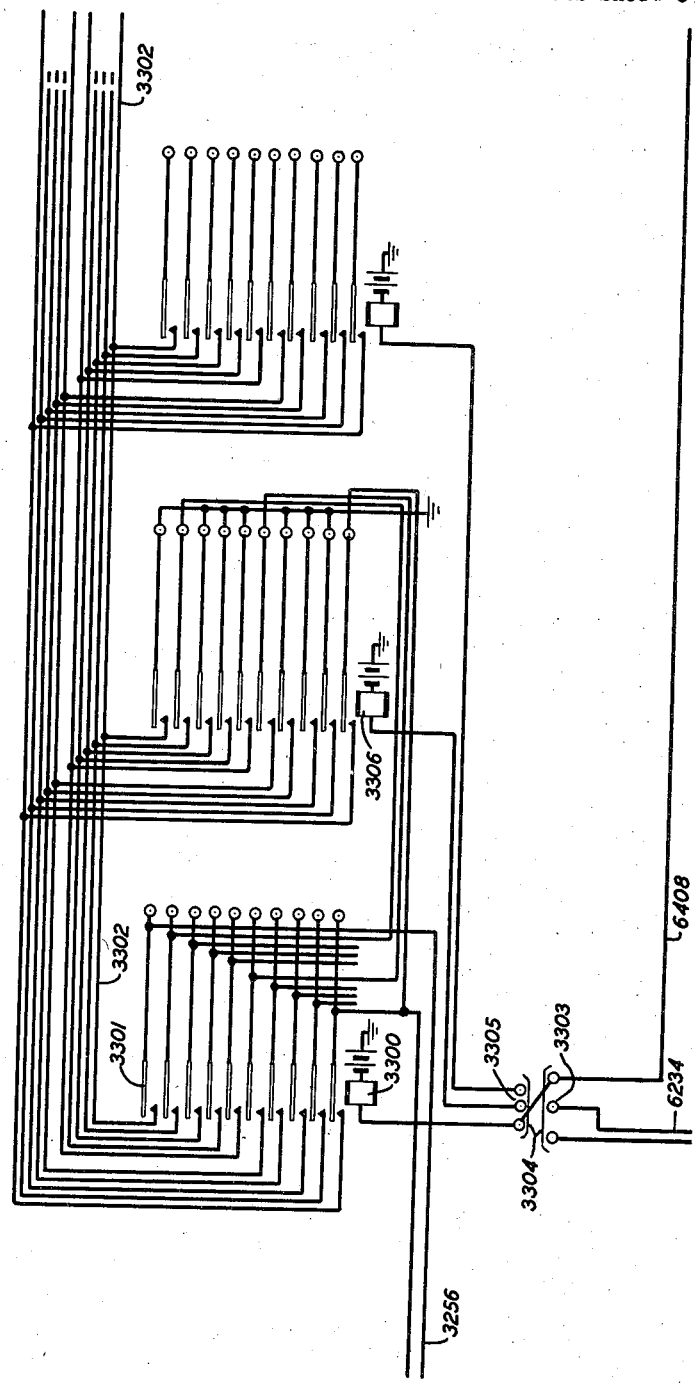
Figure 4:
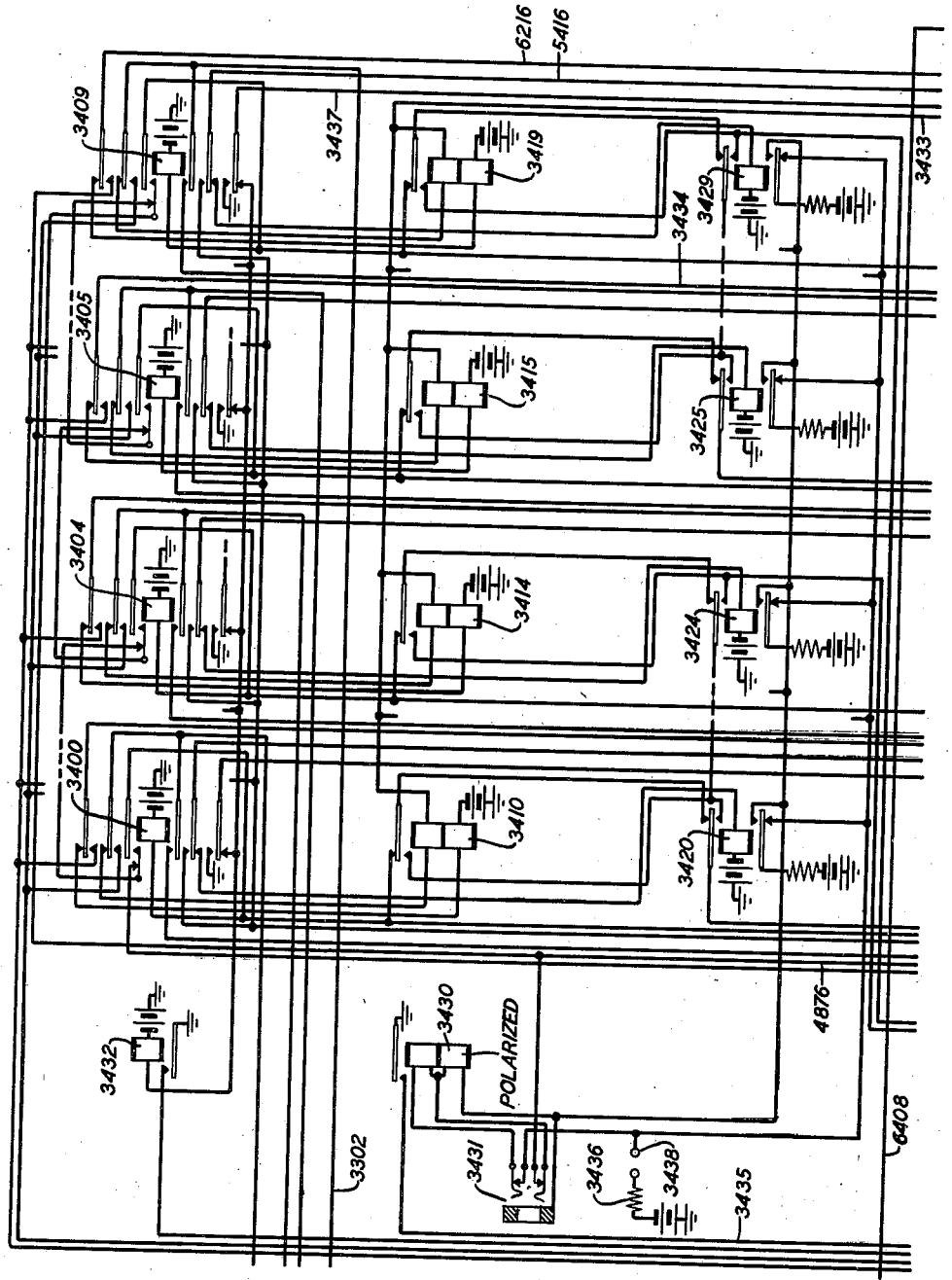
Figure 5:
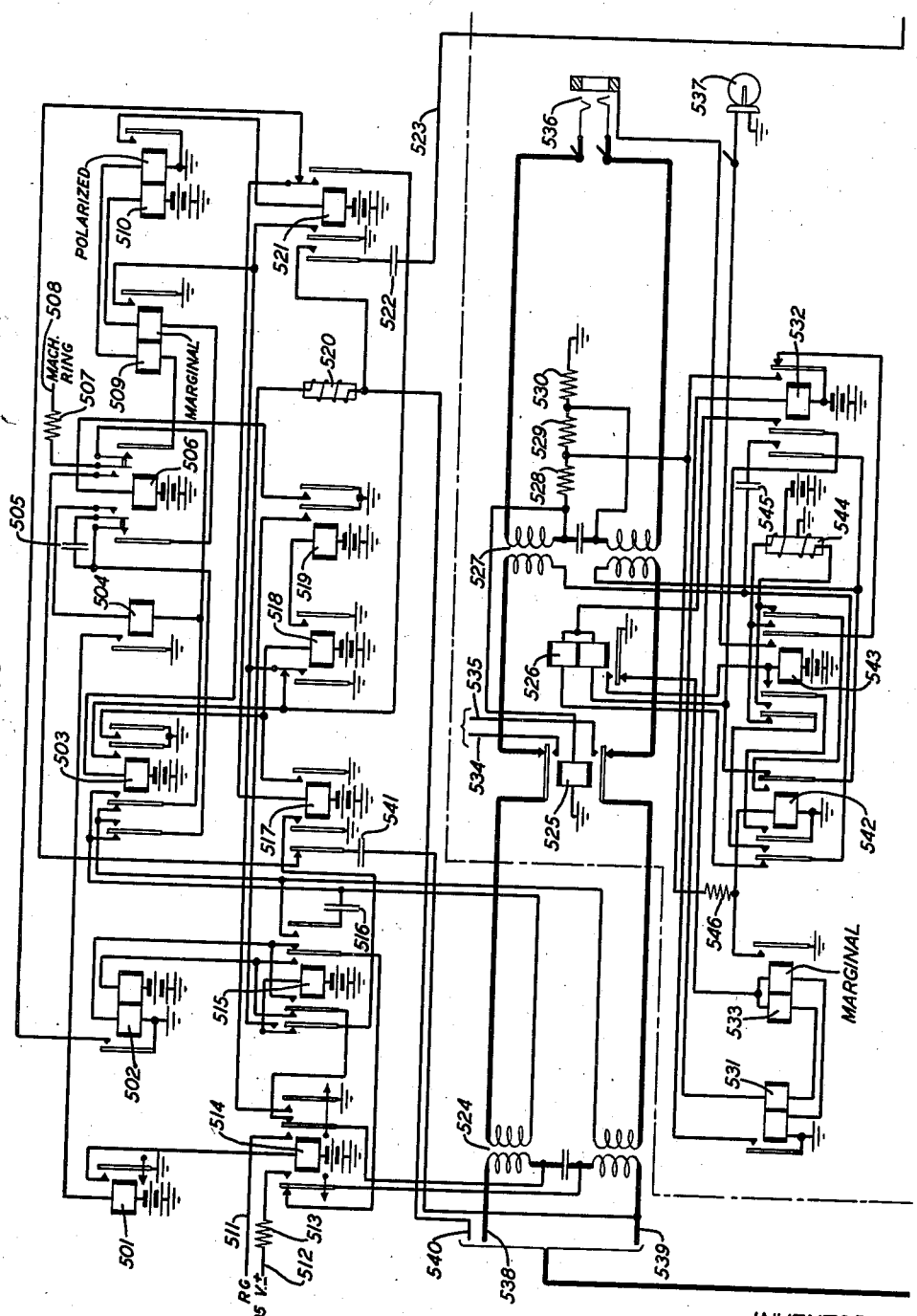

Referring now to Fig. 2, when the subscriber at substation 200 initiates a toll call, which must be handled by a toll operator, he is connected by means of line link 201, district link 202 and office link 203 to the equpment at the outgoing end of the toll trunk 204. This equipment passes a signal over the trunk 204 to the equipment at the toll operator's position, lighting a lamp thereat to which the operator responds by inserting the answering end of her cord 205 in the trunk jack. She operates listening key 206 of the cord circuit and, after receiving the details of the call and the number of the calling line, operates listening key 207 of the number checking cord 208. The operation of this key transforms the connection between her headset and the cord 205 to a monitoring connection. She then tests for an idle number checking thrunk 209 leading to the originating office. This trunk terminates in incoming junctor 210 at the "B" board of that office and the seizure of the junctor causes the terminating link 211 to operate to connect the junctor with a "B" sender 212. The "B" sender then hunts for an idle "B" operator's position 213 and connects the "B" operator through to the number checking trunk over which the toll operator passes the number of the calling subscriber. The "B" operator then sets up the number on the "B" sender which operates the marker connector 214 to seize a special marker 215, after which the number is transferred to the marker. The marker connects with the line choice in which the calling line lies by means of the line choice connector 217 and then establishes a second connection with the incoming junctor 210 by means of the incoming connector 216. The marker then applies checking tone through the line choice connector 217 to the test terminal of the line and, if the number has been given correctly, over the sleeves of the line, district, and office links to the equipment at the outgoing end of the toll trunk which is connected over conductor 218 with the number checking trunk and incoming junctor 210 and thence through the incoming connector to the marker where an indication is received that the number has checked. The marker then passes a signal through the incoming connector 216 to the incoming junctor 210 which relays the signal to the number checking trunk, lighting a lamp at the toll operator's position as a signal that the number has checked properly.

If the subscriber initiates a call which may be handled by the "A" or zero operator, the dialing of the proper code will connect his substation through link 201, district link 202 and office link 203 with the jack appearing at the "A" operator's position of a zero operator's trunk indicated at 219. The operator responds by inserting the plug of her special cord 220 in the trunk jack and learns the details of the call and the calling number. She then operates key 221 associated with the number checking position circuit 222 and also prepares her key pulsing position circuit 223. The number checking position circuit 222 is connected by means of the number checking link 224 with an incoming junctor 225. This junctor associates itself by means of an "A" sender link 226 with an idle "A" sender 227, and the operator is signaled that the sender is ready. She then sets up the calling number on her position key-set recording the number in the "A" sender. When this registration is completed the incoming junctor 225 seizes a terminating sender 228 by means of the terminating link 211, and the sender 228 in turn seizes a marker which establishes a connection with the incoming junctor 225 through incoming connector 230 and connects the checking current to the test terminal of the line as before. In this case the checking current extends over the sleeves of the line link, district link and office link to the incoming trunk 219 at the "A" operator's position where it passes over conductor 229 to the number checking position circuit 222 and over the number checking link 224, incoming junctor 225 and incoming connector 230 back to the marker 215. As before, the marker passes the signal to the incoming junctor that the check has been successful and the junctor lights a lamp associated with the number checking position circuit to indicate that fact to the "A" operator.

Referring now to the detail drawings, the case of a call involving the "A" operator will be discussed first and that controlled by a toll operator will appear later.

Assuming that the subscriber at substation 800 wishes to make a toll call which may be handled by the local "A" operator, he will dial zero. His line will be connected through line link 801, district link 802 and office link 803 to a trunk terminating in jack 1205, Fig. 12. When the connection is established with the jack, the sender bridges a relay across the tip and ring conductors 1223 and 1224 completing a circuit from battery through the winding of relay 1214 over the outer upper contact of relay 1203 to conductor 1223, through the sender relay, back to conductor 1224 and over the lower back contact of relay 1203 to ground through resistance 1204. Relay 1214 operates, lighting lamp 1217 as a signal to the operator. It also closes a circuit for relay 1216 which grounds conductor 1225 directly and conductor 1226 through retard coil 1201, this ground serving as a holding circuit for the hold magnets of the line, district and office link switches. The completion of the circuit at the trunk jack causes the sender to advance and rearrange the district junctor circuit to supply a substitute bridge, after which the sender releases.

The operator, noting the lighting of lamp 1217, inserts plug 1206 in jack 1205, completing a circuit from battery through the winding of relay 1218, sleeves of plug 1206 and jack 1205, winding of relay 1203 to ground. Relays 1218 and 1203 operate, relay 1203 disconnecting battery and ground from the tip and ring conductors which have now been extended over the tip and ring contacts of the jack 1205 and plug 1206 and the front contacts of relay 1218 to the windings of relay 1219. Relay 1214 therefore releases, extinguishing lamp 1217. Relay 1216 is held operated from battery at the lower front contact of relay 1203. It is to be noted that the battery and ground supplied to the tip and ring conductors is the reverse of that supplied by the trunk. This reverse battery is a signal to the district junctor to arrange the circuit for talking to the operator.

Figure 14:
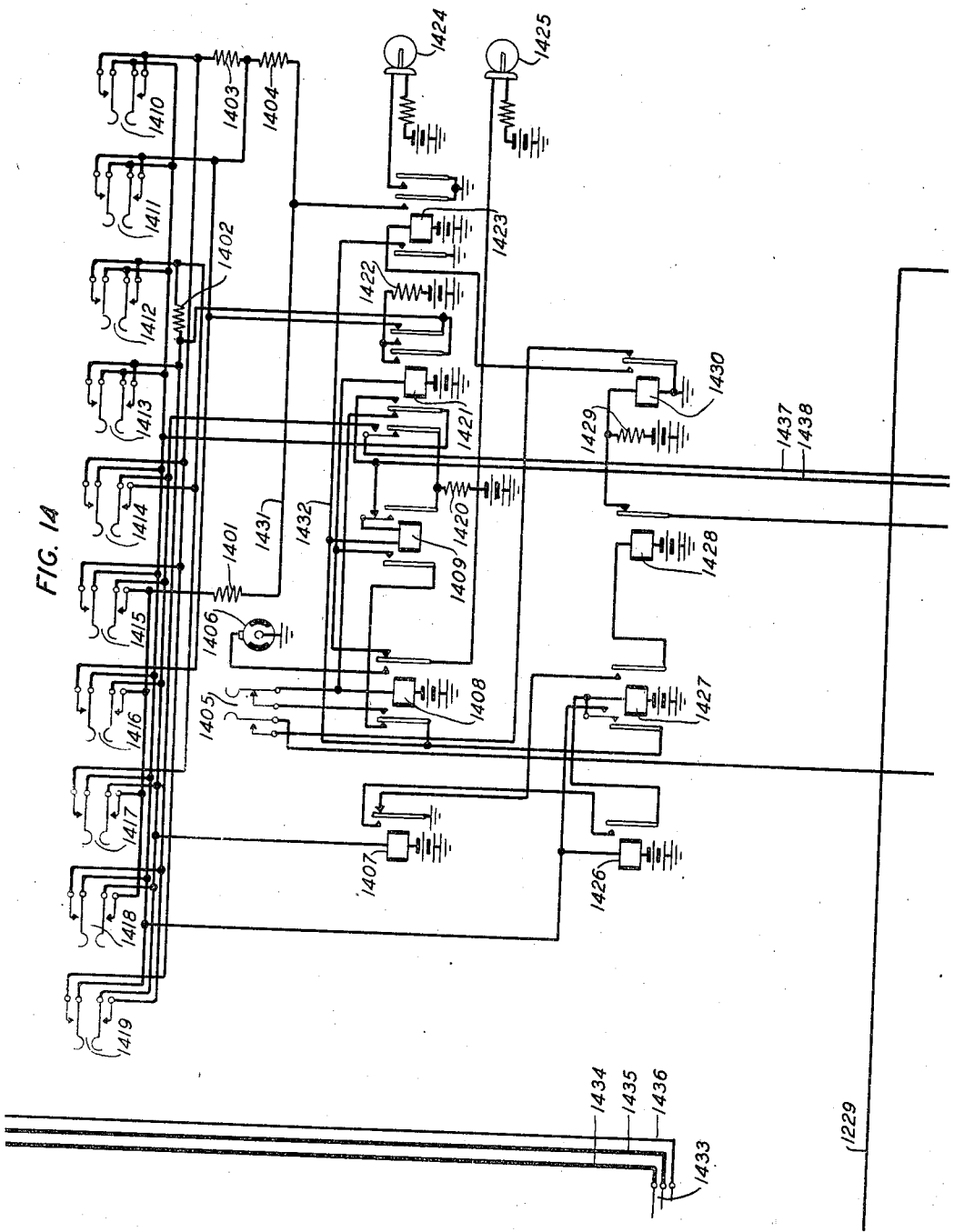
Figure 15:
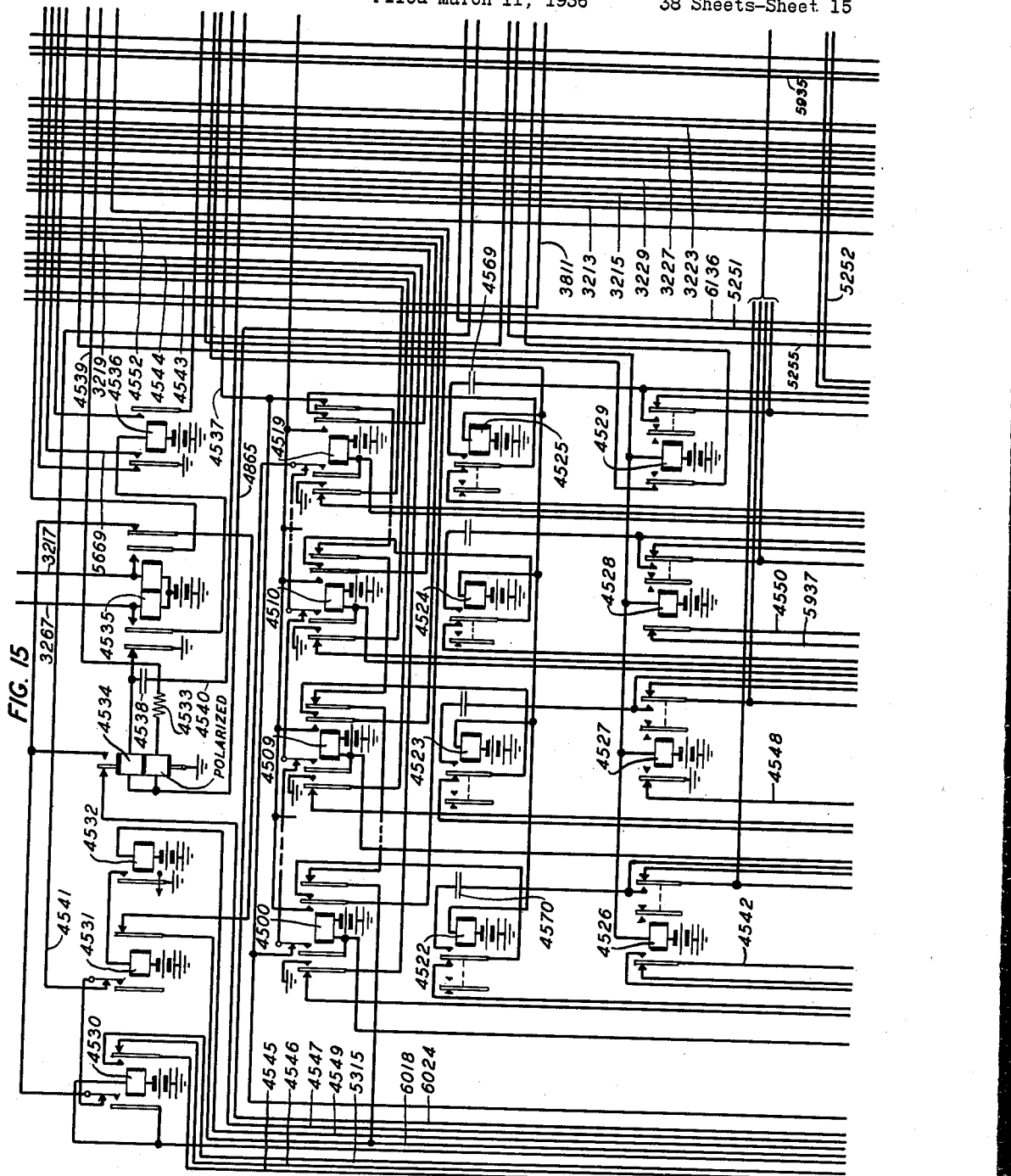
Figure 16:
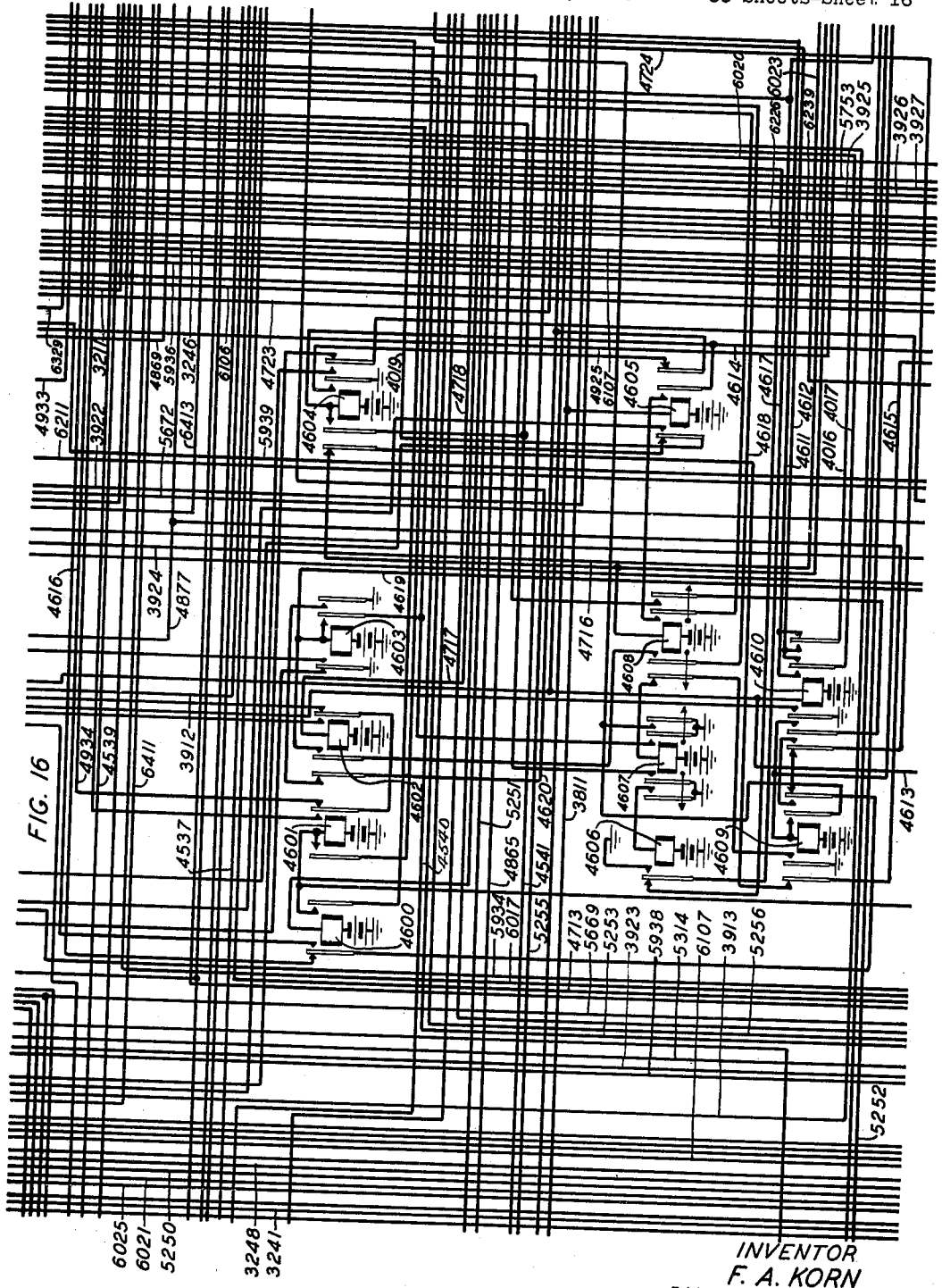
Figure 17:
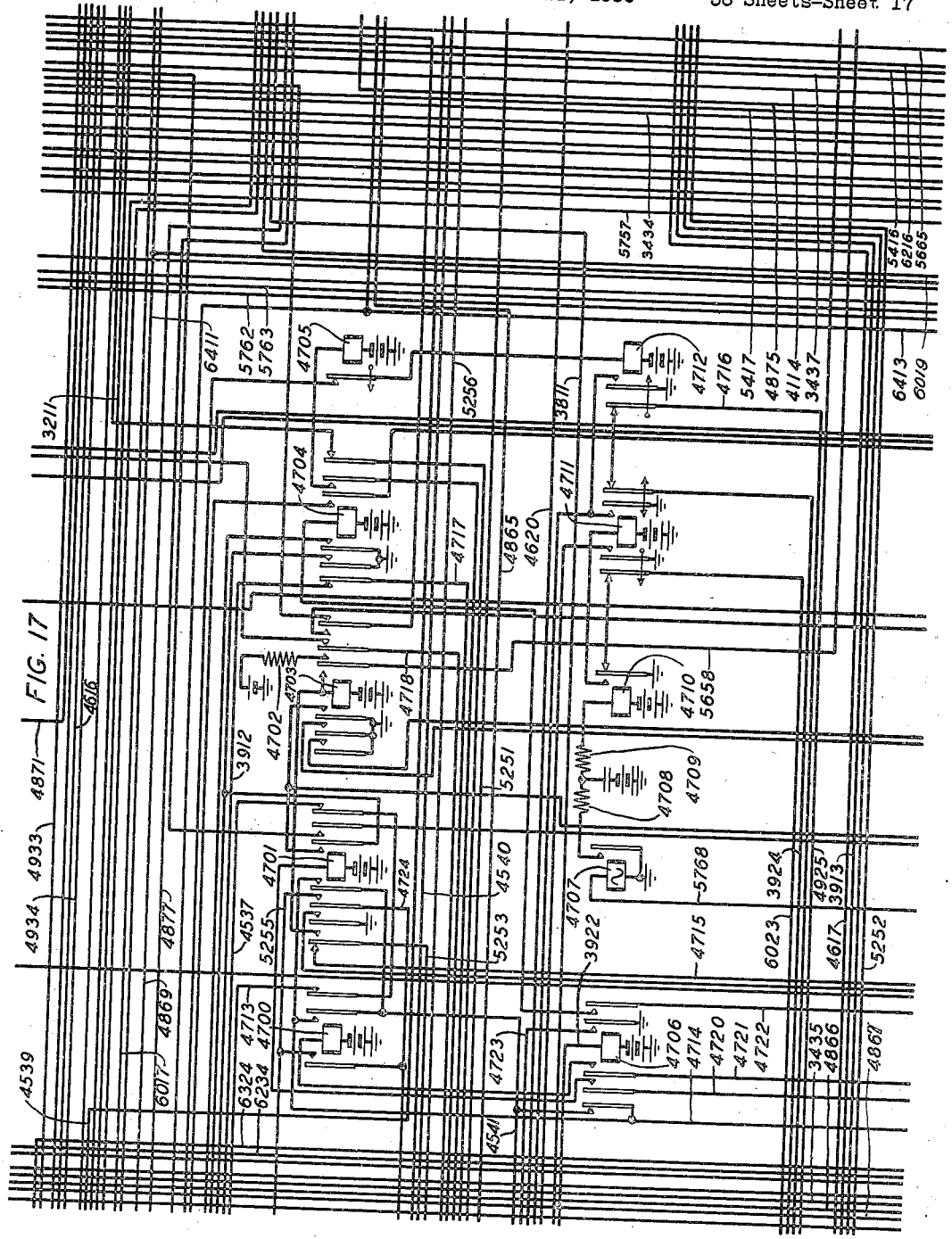
Figure 21:
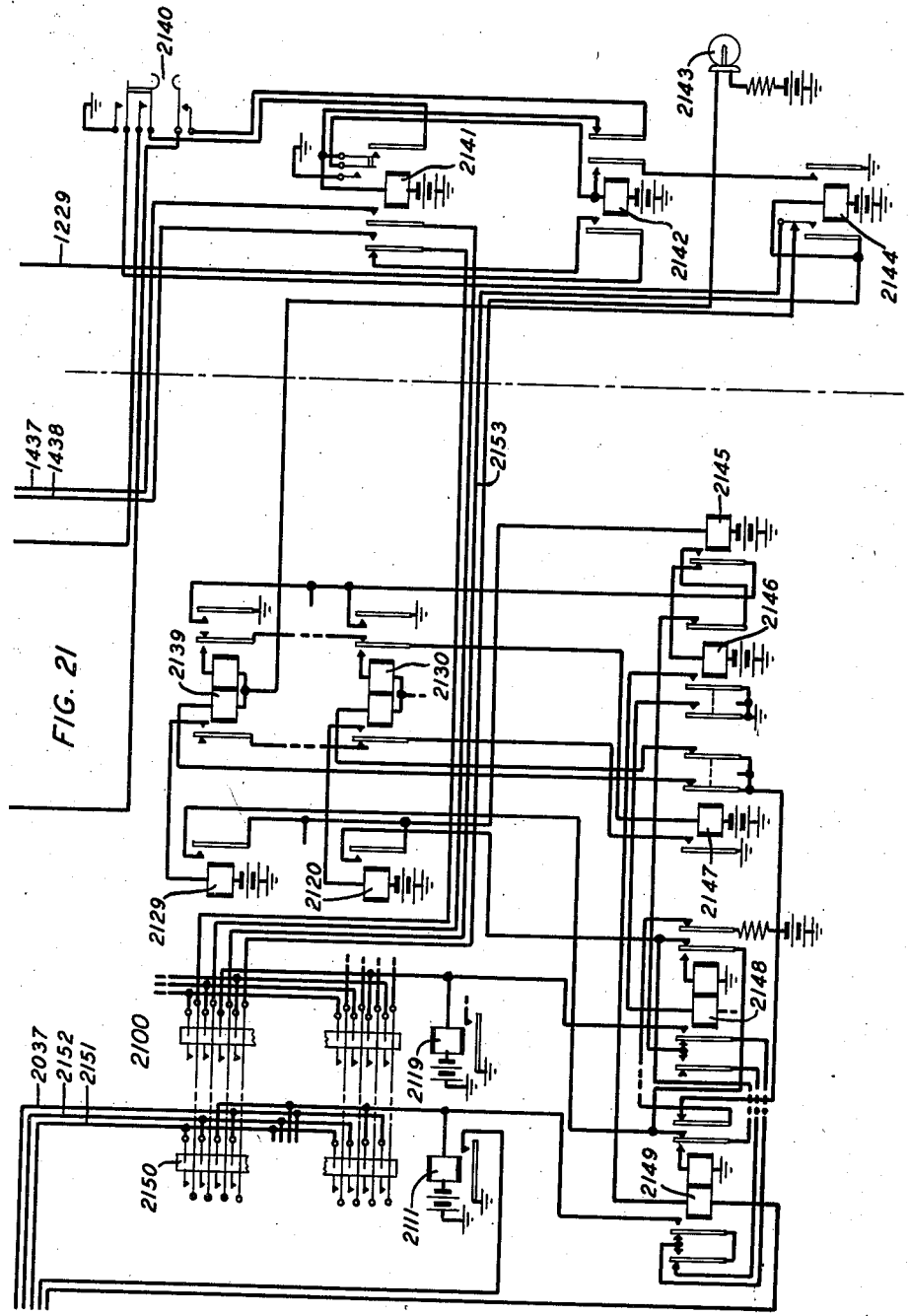
Figure 22:
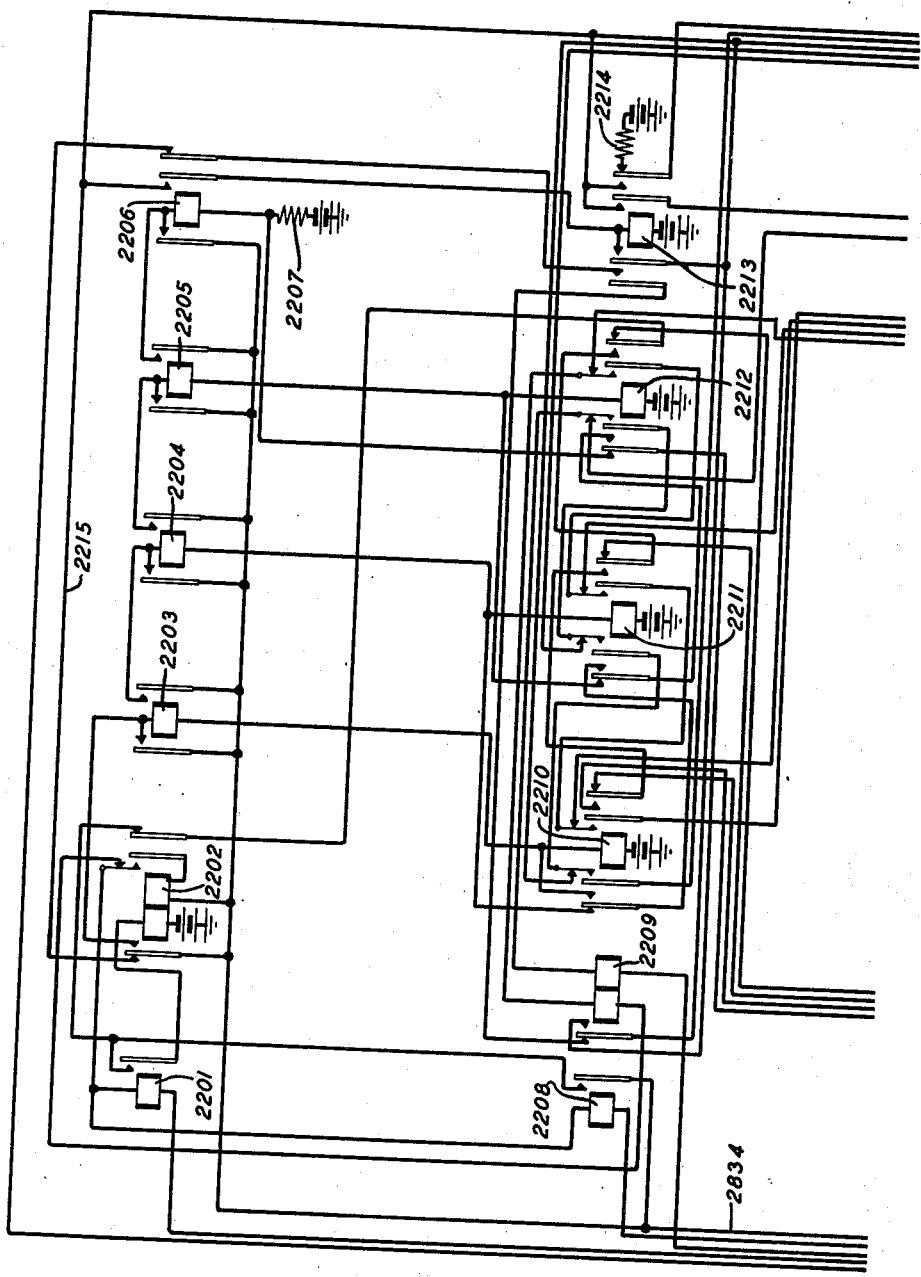
Figure 23:
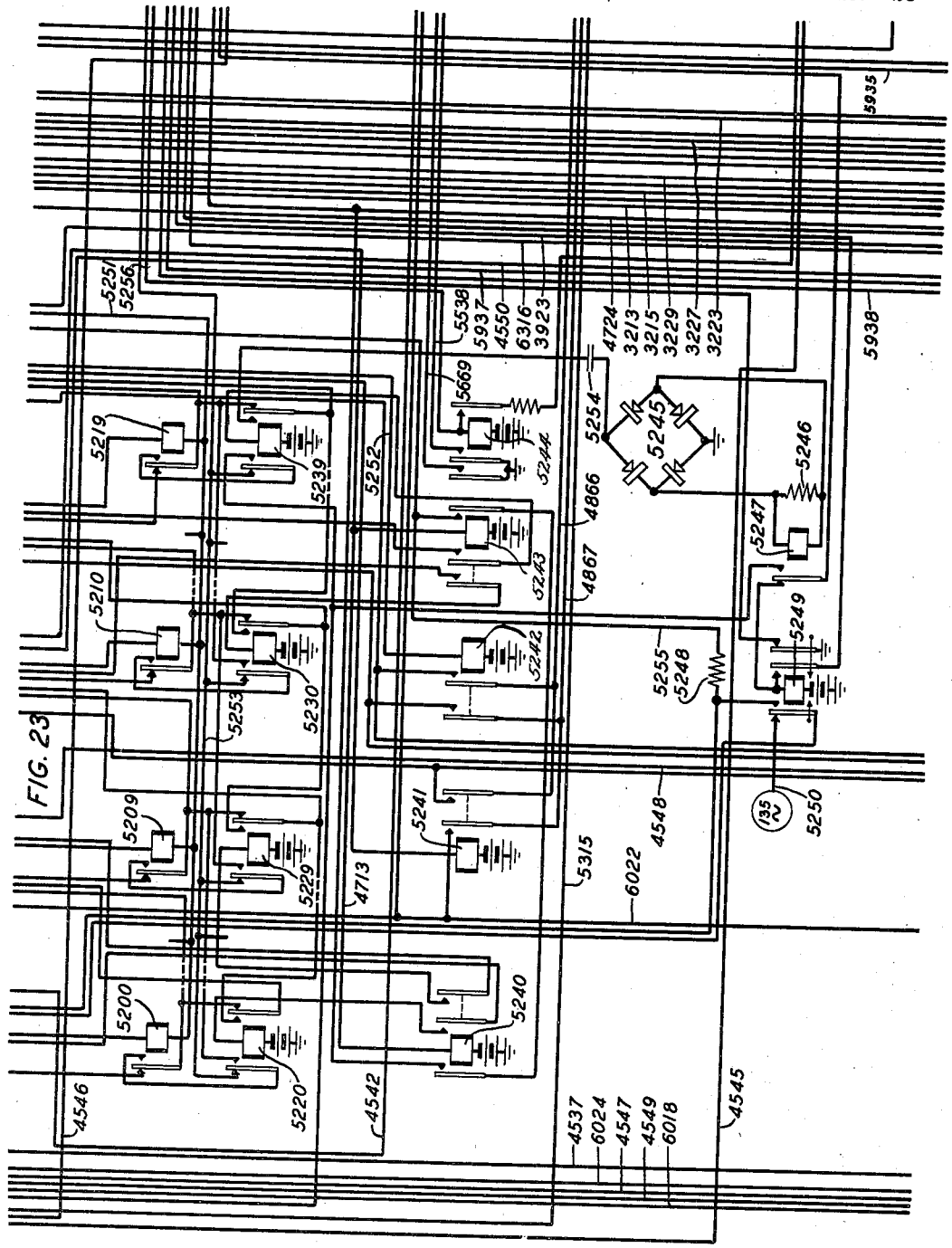
Figure 24:
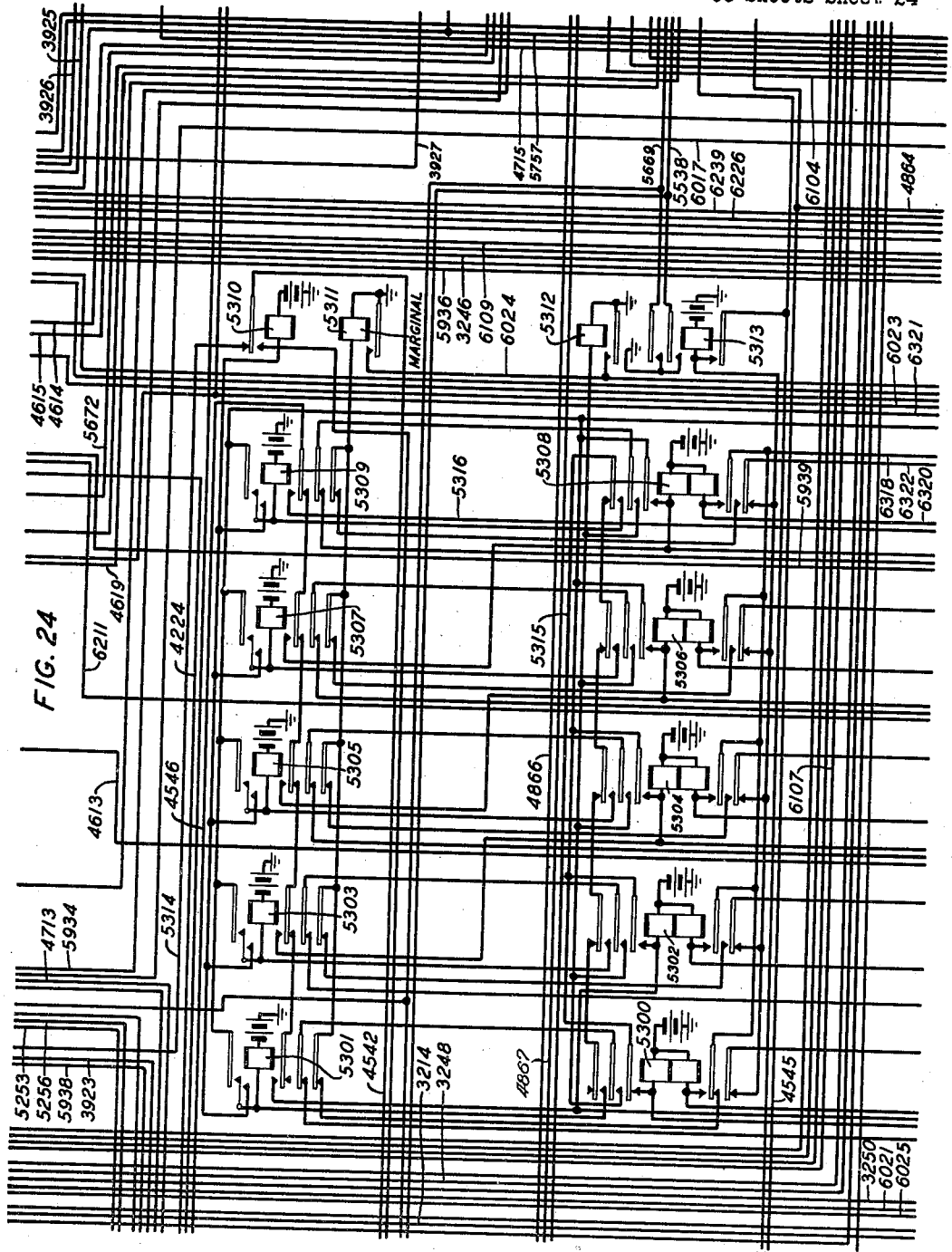
Figure 25:
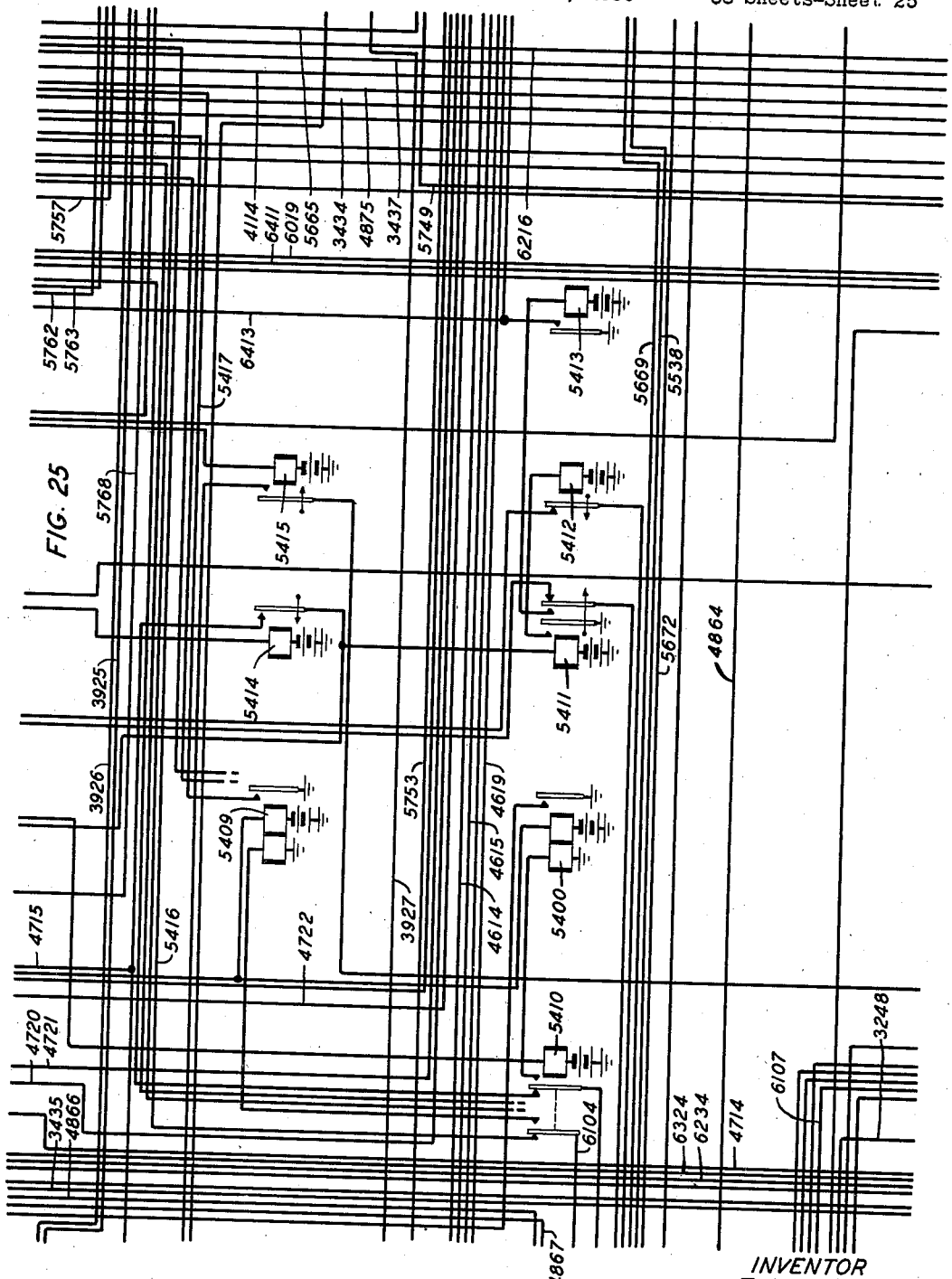
Figure 26:
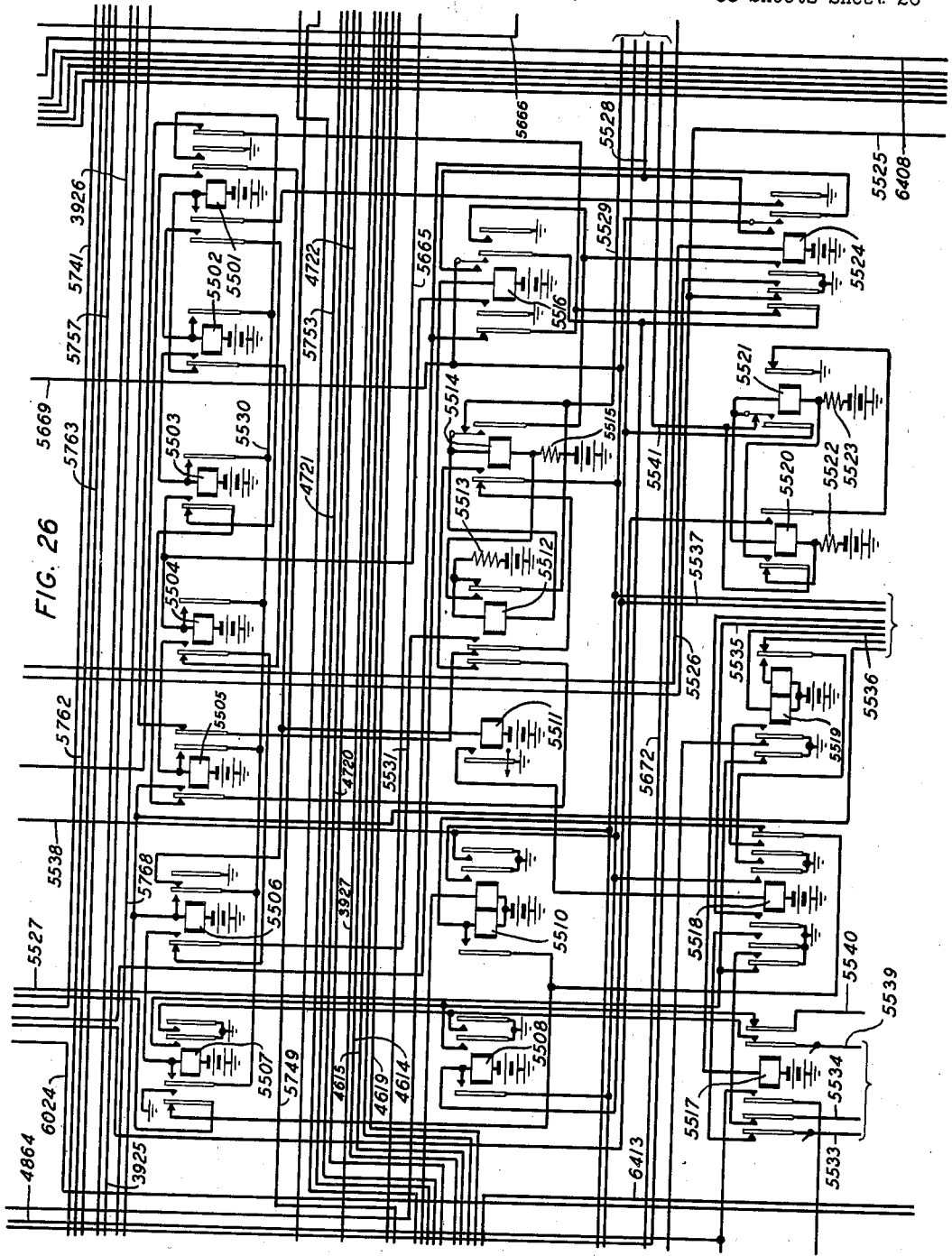

The operator then operates talking key 1207 which connects her telephone O. T. to the cord circuit, after which she inquires the wishes of the calling subscriber and, being given both the calling and called numbers, and learning that the called number is located at a toll point, proceeds to check the accuracy of the calling number as given by the calling subscriber. To check the number given by the calling subscriber the operator's position is provided with a key-set as shown in Fig. 14 and with a number checking circuit as shown at the right of Fig. 21. The operator depresses number checking key 2140 to connect with a number checking incoming junctor and thereover with a number checking marker and the calling line. The operation of key 2140 connects ground over the outer upper contact of the key, left normal contact of relay 2144, left winding of relay 2139, individual to this operator's position in the number checking link circuit, inner right contact of relay 2147, outer right back contact of junctor relay 2149 and over similar contacts of other corresponding relays to battery over the outer right back contact of relay 2148. The extension of this circuit over the back contacts of the junctor relays prevents completion of two connections at once. Assuming that a link is available, relay 2139 operates, locking over the back contacts of relay 2130 and relays belonging to other positions through the winding of relay 2147 to battery. Relay 2147 opens the operating circuit of the position relays and individualizes the link to the position. Relay 2139 closes a circuit from ground at its outer right contact over the back contact of relay 2145, through the winding of relay 2146 to battery. Relay 2146 connects ground to the left windings of all of the trunk relays of the link, the circuit of relay 2149, extending, provided that trunk is available, over the lower back contact of relay 2005, middle lower contact of relay 2004, inner lower back contact of relay 2009, outer lower back contact of relay 2007, tip contact of jack 2006 to battery thereby operating relay 2149.

Relay 2147 also closes a circuit from ground at its left front contact, over the left back contacts of relay 2130 and the intermediate position relays, left front contact of relay 2139, through the winding of select magnet 2129 of the number checking link switch 2100. As soon as magnet 2129 operates it closes a circuit from battery through the winding of relay 2145, contact of magnet 2129 over the inner right back contact of relay 2148 and the corresponding contacts of the intermediate trunk relays, right front contact and right winding of relay 2149 to ground. A holding circuit is thereby closed for relay 2149 and an operating circuit for relay 2145. Relay 2145 opens the circuit of relay 2146 which releases, disconnecting ground from the trunk relays and letting all but the locked relay release. When relay 2146 closes its back contact a circuit is completed from ground at the outer right contact of relay 2139, front contact of relay 2145, back contact of relay 2146, inner left back contact of relay 2148 and the corresponding contacts of the intermediate trunk relays, left front contacts of relay 2149, winding of hold magnet 2111 and battery. Magnet 2111 closes the cross-point 2150 in the row prepared by magnet 2129, thereupon extending its operating ground over the second lower contact of cross-point 2150, conductor 2153, winding of relay 2144 and battery. Relay 2144 closes a locking circuit for itself and magnet 2111 over its left alternate contact to ground at key 2140. Relay 2144 opens the circuit of relay 2139, which in turn releases select magnet 2129.

The operator's position equipment is now connected through to the number checking incoming junctor.

Magnet 2111 closes a circuit from ground at its contact through the winding of relay 2005 of the number checking junctor. Relay 2005 opens the operating circuit of relay 2149 to mark this junctor busy to other positions. The release of select magnet 2129 releases relays 2145 and 2149 placing the link in condition to establish a second connection, if desired.

At the same time that key 2140 is operated, key 1405 is operated momentarily, completing a circuit from battery through the winding of relay 2141, right back contact of relay 2142, lower contact of key 2140, left contact of key 1405 to ground at the back contact of relay 1430. Relay 2141 locks over its outer right contact, inner upper contact of key 2140, back contact of relay 1428, winding of relay 1430 and ground, holding relays 2141 and 1430 operated after key 1405 is released. Relay 2141 also closes a circuit from ground over its inner right contact, winding of relay 2142 and battery. Relay 2142 locks under the control of relay 2144 and opens the operating circuit of relay 2141 which was also opened by relay 1430. Relay 1430 closes an obvious circuit for relay 1423 which lights lamp 1424, connects ground to the key-set over conductor 1431 and grounds conductor 1432. Relay 2141 further connects the number checking junctor over the number checking link switch 2100 to the position circuit, preparing circuits for setting up the line number.

When relay 2005 operates under the control of hold magnet 2111 it connects ground over its lower front contact to conductor 2017 to provide locking ground for various junctor relays and to summon an idle "A" sender.

Ground on conductor 2017 extends over the inner lower back contact of relay 2007, lower back contact of relay 2010, outer lower back contact of relay 2004 to conductor 2020 leading to the "A" sender link and control circuit 2015 which functions, in a manner similar to the terminating sender link and control circuit shown in the Carpenter patent above-identified, to seize an idle sender 2016 and connect the same with the number checking junctor. When the sender is ready, ground is connected to conductor 2021, operating relay 2004. Relay 2004 connects ground to conductor 2017, extends the tip and ring conductors 2151 and 2152 to conductors 2023 and 2022 leading to the sender to prepare for registering the wanted number, and opens the link start lead 2020.

The closure of the ring conductor connects battery through resistance 1420 over the outer left back contact of relay 1421, conductor 1437, inner left front contact of relay 2141, ring contact of cross-point 2150, conductor 2152, outer upper front contact of relay 2004, conductor 2022 to the sender, and ground over the left contact of relay 1423, conductor 1432, winding and normal contact of relay 1409, conductor 1438, outer left front contact of relay 2141, tip contact of cross-point 2150, conductor 2151, inner lower front contact of relay 2004, conductor 2023 to the sender. The connection of battery to the ring conductor operates a relay in the sender which closes battery to the tip conductor, operating relay 1409. Relay 1409 locks to battery through resistance 1420 under the control of relay 1423. It also closes a circuit from grounded conductor 1432, left back contact of relay 1408, left front contact of relay 1409, in parallel through the winding of relay 1421 and lamp 1425 to battery. Relay 1421 connects battery to key-set 1400 and connects the key-set to the conductors 1437 and 1438 in preparation for registration, which takes place in substantially the manner disclosed in Patent No. 1,897,083 to W. B. Strickler granted Feb. 14, 1933, the operator recognizing the lighting of lamp 1425 as an indication that the "A" sender is ready.

When registration is complete, relays 1407 and 1426 are operated simultaneously by the sender, closing a circuit for relay 1427 which locks to conductor 1432, holds relay 1426 operated and, when relay 1407 releases, operates relay 1428, releasing relays 1430 and 2141.

When the sender was connected to the junctor, ground over the upper back contact of relay 2010 and conductor 2024 indicated to the sender that a four digit number only would be received and the sender after recording this signal connected ground to conductor 2025 operating relay 2010, which locked over its inner lower front contact, back contact of relay 2011 to grounded conductor 2017. With relay 2010 operated, the fundamental tip and ring conductors 2024 and 2026 from the "A" sender are connected with the tip and ring conductors 2027 and 2028 leading to the terminating sender link and control circuit 2013. Ground is connected to conductor 2028 over the inner upper back contact of relay 2009 and battery to conductor 2027 through the winding of relay 2008 over the outer lower contact of relay 2009.

When the "A" sender is ready to transfer the registration it connects a bridge across conductors 2024 and 2026 operating relay 2008. Relay 2008 connnects ground over the middle upper back contact of relay 2007 to conductor 2029, which is the start lead for the terminating sender link and control circuit. This control circuit thereupon functions to seize an idle cross-bar terminating sender and connect it through to the number checking incoming junctor, Fig. 20.

When the terminating sender has closed its pulsing circuit, it grounds conductor 2030, operating relay 2009 which disconnects ground and relay 2008 from the pulsing circuit. Transfer of the registration then takes place, the terminating sender generating revertive pulses which are treated by the "A" sender in the usual manner.

While pulsing is taking place, the terminating sender receives ground over the inner upper back contact of relay 2007 and conductor 2031 as an indication that a marker equipped for handling special calls must be seized. When the registration has been completed, the terminating sender grounds conductor 2032, operating relay 2007 which locks to conductor 2017. Relay 2007 disconnects ground from conductor 2031 and extends the conductor to the winding of relay 2001.

The "A" sender having completed its function connects ground to conductor 2033, operating relay 2011 which locks to conductor 2017 and opens the locking circuit of relay 2010. The "A" sender is now released and ground is removed from conductor 2021, releasing relay 2004.

Fig. 27 shows the marker connector in the form of a box 2700. This connector is essentially the same as that used in the past for connecting the panel sender with the decoder, such as shown in Patent 1,862,549, granted to R. Raymond et al., June 14, 1932. The circuit consists of a plurality of multicontact relays, one for each sender, arranged in groups and a multicontact relay for each marker for each group, together with control relays for determining the order of use and to prevent double connections. For each connection, one sender relay and one marker relay are operated to close through a plurality of contacts between the sender and marker. The terminating sender passes the special marker signal to the marker connector which responds by selecting a special marker for use on this call.

When the connection between the sender and marker has been established twenty leads are closed, connecting the sender registers to the registers 4900, 4910, 4920, 4800 and 4810 of the marker. In addition, a lead is closed to determine the tens designation of the frame and three check leads are closed as well as certain other leads.

Furthermore, the marker connector grounds conductor 5672 as an indication that the marker has been seized in connection with a special call. Ground on this conductor completes a circuit over the left back contacts of relays 3901 and 3902, conductor 3922, winding of relay 4706 and battery.

Assuming that the number given is 9299 and that the number checking junctor is located on frame No. 0, the cross-points closed in the terminating sender connect direct ground to conductors 5650 and 5652 to 5657, operating thereover register relays 4913 and 4914 of thousands register 4910, relay 4922 of hundreds register 4920, relays 4804 and 4803 of the tens register 4800 and relays 4813 and 4814 of units register 4810. No circuit is closed for relays of frame register 4900 nor for relay 4905.

At the same time that these direct circuits are closed, a circuit is closed from ground in the marker connector over conductor 5658, back contacts of relay 4824 and conductors 4860, 4861 and 4862 to the contacts of each operated cross-point which are not grounded directly. Therefore, relays 4901 to 4904, 4911 to 4914, 4921 to 4924, 4801 to 4804 and 4811 to 4814 are operated together with relays 4100, 4905 and 4827, provided the registering circuits between the sender and marker are complete. Relays 4823, 4822 and 4821 are connected to conductors 4862, 4860 and 4861, respectively, and also operate over the back contacts of relay 4824 if ground is connected to the corresponding conductors.

If all of the register relays operate, a circuit is closed from ground through the left winding of relay 4825, inner right front contacts of relays 4901 and 4902, inner left front contacts of relays 4903 and 4904, outer left front contact of relay 4905, inner left front contacts of relays 4914, 4913, 4912, 4911, 4921, 4922 and 4923, second left contact of relay 4924, inner right front contacts of relays 4804, 4803, 4802, 4801, 4811 to 4814, 4821 to 4823 and 4827, middle upper front contact of relay 4100, left winding of relay 4826 and battery.

Relays 4826 and 4825 both operate in this circuit, relay 4826 locking over its right winding and outer right contact and the left normal contacts of relay 4824 to grounded conductor 5658. Relay 4825 also locks over its right winding and outer right contact and the left normal contacts of relay 4824 to grounded conductor 5658. With relays 4826 and 4825 both operated, a circuit is closed from battery, through the winding of relay 4824, inner right contacts of relays 4826 and 4825, to grounded conductor 5658. Relay 4824 operates, locking over its inner left alternate contacts to conductor 5658. The make-before-break character of the inner left contacts of relay 4824 holds relays 4825 and 4826 until the locking circuit of relay 4824 is fully established, after which these relays release. Relay 4824 at its second left front contact operates relay 4833. Relay 4833 prepares the circuit of polarized relays 4534 and 4106. The operation of relay 4824 disconnects ground from conductors 4860, 4861 and 4862, thereby releasing those register relays operated thereover as well as relays 4821, 4822, 4823, 4827 and 4100.

With relay 4824 operated and relays 4825 and 4826 released, a circuit is closed from grounded conductor 5658 over the outer right front contact of relay 4824, left back contacts of relays 4826 and 4825, left back contact of relay 4827, left back contact of relay 4821, to the contacts of the thousands register 4910. Ground is supplied to the contacts of the hundreds register 4920 over conductor 4925, normal contacts of relays 3904, 3903, 3902 and 3901, conductor 3913, back contact of relay 4922, outer left front contact of relay 4824 and grounded conductor 5658. Ground is also supplied to the contacts of the tens register 4800 from the third left contact of relay 4824 and the back contact of relay 4823.

As set forth in the above-identified Carpenter patent, the lines of the office are arranged in large groups, called for convenience "choices", each choice including four frames on which are mounted ten horizontal groups of switches or levels which may contain from one to seven individual switches each serving ten lines. For selection as called lines for the purpose of testing their busy or idle condition, as well as for number checking, the subscribers' lines are arranged in numerical groups of twenty which, being consecutive, all appear within the same hundred group and within a given choice.

The marker is connected to the lines through a line choice connector 806, Fig. 8, one for each of the line choices. In each choice connector there are a number of hundreds relays, one for each hundred lines in the choice and a number of group relays, one for each group of twenty lines.

Figure 35:
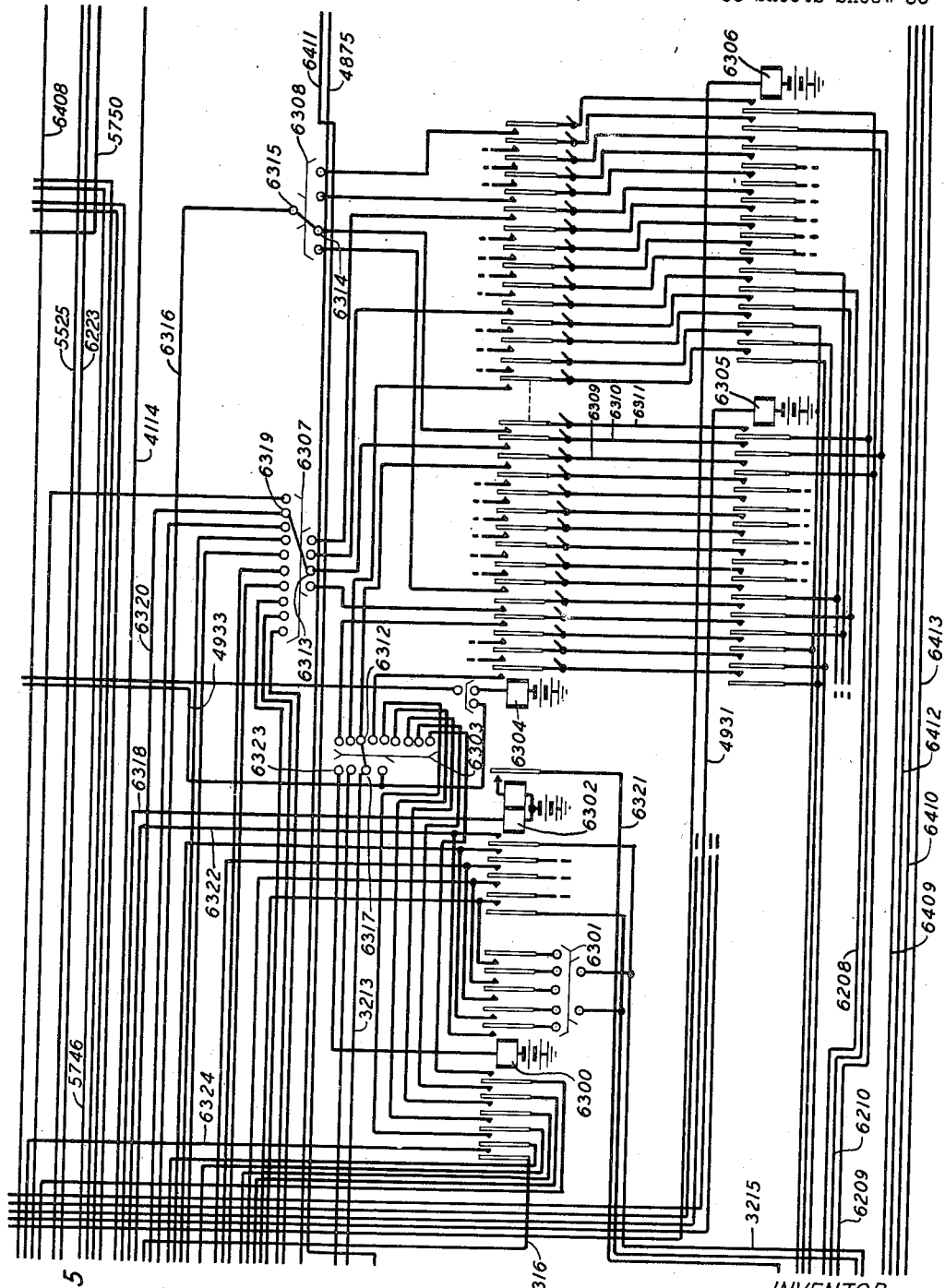
Figure 36:
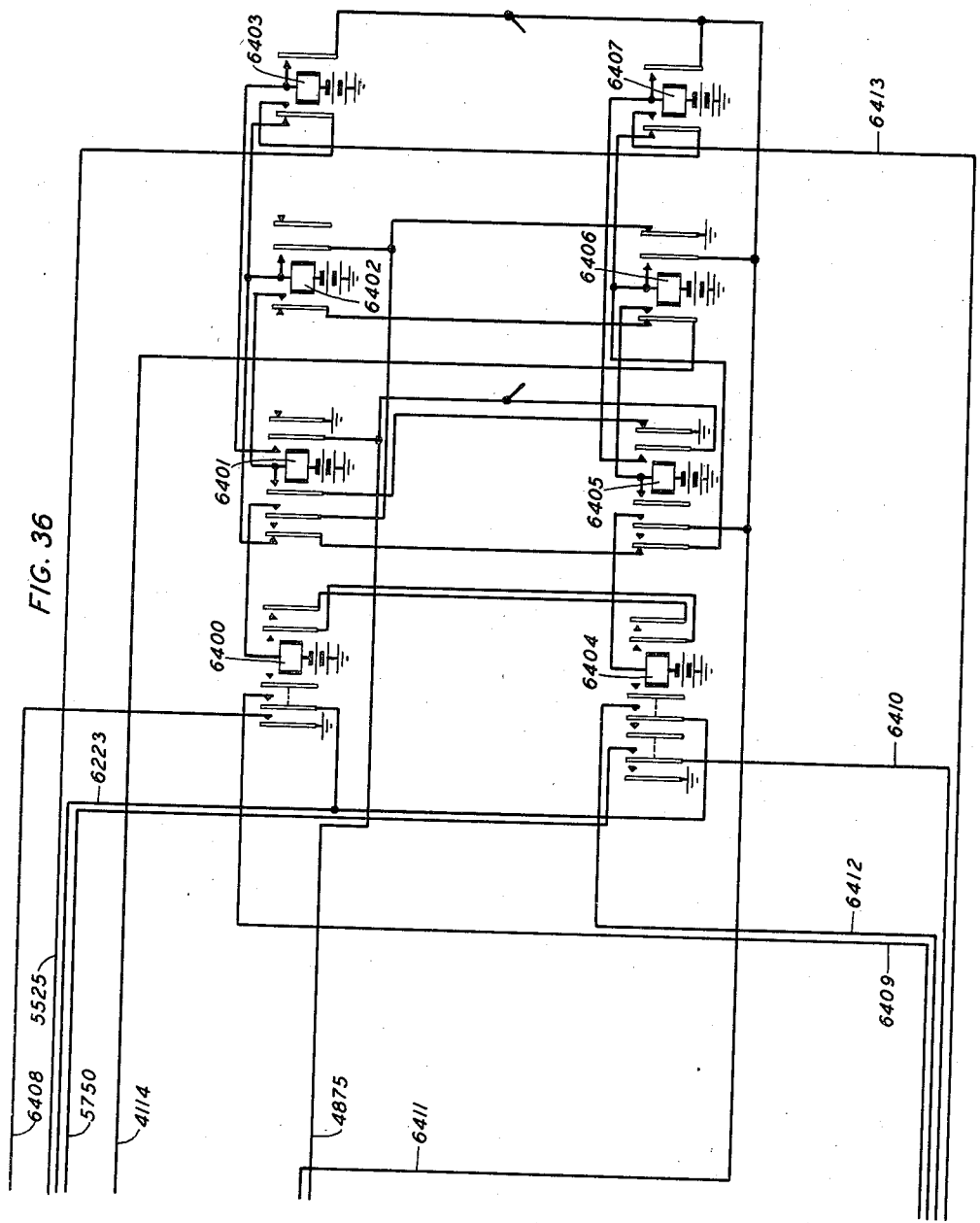

A group of twenty lines is identified from the line designation by a translation of the thousands, hundreds and tens digits. These digits as recorded in the marker combine to mark 500 sets of cross-connecting points, a few of which are shown in Fig. 35, by operating one of twenty "five-hundred's" relays, such as relay 6304, one of five "hundred's" relays, such as relays 6305 and 6306 and one of five "twenty's" relays, such as relays 6240 and 6244. These relays with their associated cross-connecting racks form what is known as a "translator". Since thousands register relays 4913 and 4914 were operated and hundreds register relay 4924 was not operated, the ground extended to the thousands register by the operation of relay 4824 extends over the outer left back contacts of relays 4912 and 4911, right front contact of relay 4914, outer right front contact of relay 4913, fifth right back contact of relay 4924 to conductor 4930 which is cross-connected to the winding of relay 6304. Each of the conductors embraced by the bracket including conductor 4930 extends to a separate relay, like relay 6304, unless the corresponding group of five hundred lines is not equipped in which case the conductor is connected over conductor 4933 to relay 3910.

The ground supplied to the hundreds register extends over the right back contact of relay 4923, right front contact of relay 4922, right back contact of relay 4921, conductor 4931 to the winding of relay 6305. Ground supplied to the tens register extends over the inner left front contact of relay 4804, inner left back contact of relay 4801, conductor 5252, winding of relay 5242 and battery to indicate that the wanted number lies in an odd ten. If the number were even, relay 5241 would be operated. This ground also extends over the outer right front contact of relay 4804, left front contact of relay 4803, to the winding of relay 6244 and battery. The joint operation of relays 6244, 6305 and 6304 identifies the group of twenty lines numbered from 9280 to 9299.

With relay 6244 operated, three circuits are prepared, one from battery through resistance 6207 over the right contact of relay 6244, to conductor 6208, a second from ground over the inner right contact of relay 6012, conductor 6015, inner left contact of relay 6244 to conductor 6209, and a third from ground through the winding of relay 6014, middle left back contact of relay 6012, conductor 6016, outer left contact of relay 6244 to conductor 6210. These three conductors are connected in multiple to the armatures of the five "hundreds" relays 6305, 6306, etc., and, since relay 6305 is operated, are extended to conductors 6311, 6310 and 6309, respectively. Conductors 6309, 6310 and 6311 are connected in multiple to armatures of the twenty "five-hundreds" relay 6304, etc. Since relay 6304 is operated, these conductors are extended to cross-connecting racks 6303, 6307 and 6308, respectively, thereby connecting battery to cross-connecting point 6314, ground through relay 6014 to point 6312 and direct ground to point 6313. These cross-connecting racks are wired in accordance with the location of the lines in the frames.

Each line choice connector has a start lead for each marker and these leads are brought into the marker at cross-connecting rack 6308. Each group of twenty consecutive numbers is a unit and will be referred to hereafter as a twenty-block. Each twenty-block has its own cross-connecting terminal in rack 6308 for the location and seizure of the line choice. Assuming that terminal 6314 is cross-connected to terminal 6315 and thereover to the start conductor 6316 of the line choice connector 806 indicated in Fig. 8, line choice connector 806 will be operated as described in the above-identified Carpenter patent, connecting the marker with the proper line choice.

When the line choice connector 806 has operated, it connects ground over conductor 3211 to the winding of relay 4835 as a signal to the marker that it has been connected with the choice. Relay 4835 closes a circuit from battery through the winding of relay 4113, right back contact of relay 4009, resistance 4012, conductor 4870 to ground at the inner right contact of relay 4835. At its outer left contact, relay 4835 grounds conductor 4864 completing a circuit over the middle right contact of relay 6012, conductor 6018, over normal contacts of relays 4531 and 4500 to 4519 to conductor 4537 which extends directly to the winding of relay 5933 and over back contacts of relays 4701 and 4700 to conductor 4713 and the windings of relays 5240 and 5243.

Figure 20:
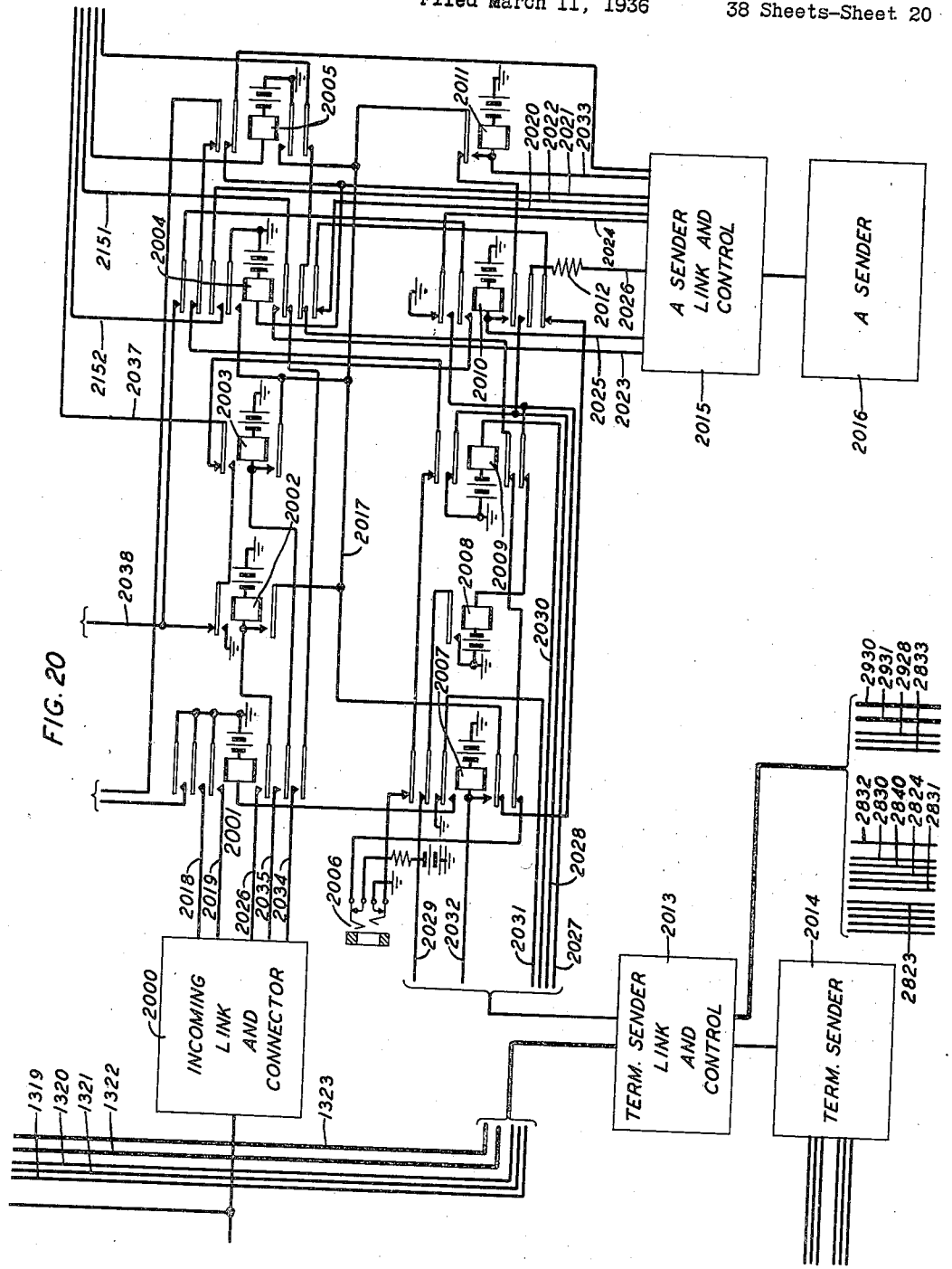

Relay 4835 also extends battery, connected to conductor 3811 by connector 806, over its outer right contact, inner right contact of relay 4824, conductor 4863 to the frame register 4900, and, since none of the frame register relays were operated, over the right back contacts of relays 4903, 4904, 4902, 4901, left back contact of relay 4903, third right back contact of relay 4905, to conductor 4932, and the incoming link and connector circuit 2000 of Fig. 20. When the incoming connector operates, it connects ground to conductor 5741, winding of relay 4834 and battery, to tell the marker that it has been connected with the calling frame.

Relay 4834 closes a circuit from battery through the winding of relay 4608, conductor 4716, over the left back contact of relay 4712, and the right back contact of relay 4711, conductor 3924, inner right back contact of relay 3909, inner left back contact of relay 3908, conductor 4877, to ground at the inner right front contact of relay 4834. A parallel branch of this circuit extends from conductor 4716, over the left back contacts of relays 4604 and 4609, to conductor 4877. Relay 4834 also closes a circuit from ground at its second right front contact, conductor 4874, front contact of relay 4113, conductor 5666 through the marker connector 2700, sender 2014, link 2013 to conductor 2031, upper front contact of relay 2007 to the winding of relay 2001 and battery.

Relay 2001 in operating, closes a circuit over conductor 2019 for connecting the junctor to the marker and over conductor 2018 connects ground through the link and connector circuit 2000 to conductor 4722 over the outer right contact of relay 4706 to the winding of relay 4704 and battery. Relay 4704 operates relays 4522 to 4529. It also closes a circuit from battery through the winding of relay 4705, outer right front contact of relay 4704, to ground at the right back contact of relay 5249.

When the line choice connector has been seized, ground through the winding of relay 6014 which is connected to terminal 6312 of cross-connecting rack 6303 and there cross-connected to terminal 6317, is extended over conductor 3213 to the winding of a hundred-block relay. The connection of ground to terminal 6313 in cross-connecting rack 6307 serves to operate one of the relays 5300, 5302, 5304, 5306 or 5308. Assuming that terminal 6313 is connected to terminal 6319, a circuit is closed over conductor 6320 to the lower winding of relay 5308 and battery. Relay 5308 extends its operating ground over its inner lower front contact, conductor 6318 to battery through the left winding of relay 6302. Relay 6302 locks through its right winding and right contact, conductor 6321, outer right back contact of relay 6012, conductor 6017 to ground at the inner left contact of relay 4835 as soon as that relay operates.

With relay 6302 operated, the circuits of the five twenty-block relays prepared by the hundred-block relay are extended over the left armatures of relay 6302 to the outer lower armatures of relays 5300, 5302, 5304, 5306 and 5308. Since relay 5308 is operated, a circuit is closed from ground through the winding of relay 5311, outer lower back contact of relay 5309, outer lower front contact of relay 5308, conductor 6322, inner left contact of relay 6302, conductor 3215, over a contact of the hundred-block relay to the winding of the proper twenty-block relay. The twenty-block relay in operating connects ground to conductor 3267 and the left winding of relay 4535 as a signal to the marker that a block of twenty lines has been selected. Relay 4535 extends its operating ground to the winding of relay 4536 which also operates.

The twenty-block relays also close two cross-connecting points for each of the twenty line circuits. One set of twenty contacts or sleeve contacts is cross-connected to the test terminals and hold magnets of the lines and extends in the marker to the inner right armatures of relays 4500 to 4519. The other twenty contacts or number control contacts are cross-connected on one side through the windings of level relays to the relays of Fig. 31, and on the other side to the outer left armatures of relays 4500 to 4519.

With relay 4704 operated, the operation of relay 4536 closes a circuit from battery through the winding of relay 5415, inner right front contact of relay 4704, right front contact of relay 4536 to ground at the left back contact of relay 3907. Relay 5415 closes a circuit from ground over the back contact of relay 4710, left back contact of relay 4711, conductor 6023, left back contacts of relays 6010 and 6011, contact of relay 5415, back contact of relay 5247, winding of relay 5249 to battery. Relay 5249 opens the circuit of relay 4705 and extends its operating ground over its right front contact to the back contact of relay 4705 and when that relay releases to the winding of relay 4712. Relay 5415 is slow to operate, as is also relay 5249. These two relays therefore measure off an interval of time before opening the circuit of relay 4705. Relay 4705 is slow to release and relay 4712 slow to operate, therefore further increasing the interval between the operation of relay 4536 and the operation of relay 4712.

It will be assumed that the number given applies to line 800 which is an individual line. The operation of the twenty-block relay connects the sleeve terminals of the block of twenty lines to the windings of the twenty test relays 5200 to 5219. The test circuit for line 800 normally extends from the winding of hold magnet 807 and from the sleeve contacts of the cross-points of the primary line switch in line link 801 over conductor 805, through the line choice connector 806 to conductor 3219, inner right back contact of relay 4519, inner left back contact of relay 4525, winding of relay 5219, conductor 5251, outer left front contact of relay 4833 to battery.

When relay 4833 operated following the operation of relay 4824, circuits were prepared for polarized relay 4534 from battery over the inner left front contact of relay 4833, conductor 4865 to both windings of relay 4534, extending through the lower winding and resistance 4533, over conductor 4539 to ground at the inner right front contact of relay 4833. A second circuit extends through the upper winding of relay 4534 to ground at the back contact of relay 4535. In parallel to this last ground a circuit extends through condenser 4538, conductor 4540 to ground over the middle left contact of relay 4833 and resistance 4831. The upper winding of relay 4534 holds the relay contact in the position shown, overcoming the effect of the lower winding. Ground on both sides of condenser 4538 holds it discharged. When relay 4535 operates from the twenty-block relay in the line choice connector as above described, it opens the upper winding of relay 4534 allowing the lower winding to become operative and close the right contact of the relay. However, current flows in the circuit through condenser 4538 until that condenser is charged, thus continuing the opposition to the lower winding for a definite time and delaying the closure of the right relay contact. The purpose of this delay in connection with a regular call is to allow sufficient time for all of the relays of group 5200 to 5219 which have been connected to busy lines to operate fully. When relay 4534 closes its left contact in connection with a normal call it closes a circuit from ground over that contact, normal contacts of relays 4530 and 4531, conductor 4541, normal contact of relay 4706, conductor 4714, outer right contact of relay 5933, conductor 4724, left front contact of relay 5240, right contact of relay 5243, conductor 5255, resistance 5248, left back contact of relay 4526, conductor 4542, back contact of relay 5310, conductor 5314, back contact of relay 3900, conductor 3923, outer left back contact of relay 6012, conductor 6019, through the units register, the circuit extending with relays 4813 and 4814 operated over the outer left front contact of relay 4813, right back contacts of relays 4812 and 4811, inner left front contact of relay 4813, left front contact of relay 4814, to conductor 4866, inner contact of relay 5242, outer right back contact of relay 4529, back contact of relay 5219, assuming the wanted line to be idle, to the winding of relay 4519 and battery. Relay 4519 sets up the operations for testing and seizing an idle switching channel.

However, with relay 4704 operated, the circuits of the test relays 5200 to 5219 are opened to render the test ineffective and the sleeve of line 800 extends from conductor 3219, over the inner right back contact of relay 4519, over the inner left front contact of relay 4525, through condenser 4569, outer right front contact of relay 4529, inner left front contact of relay 5242, conductor 4866, left front contact of relay 4814, inner left front contact of relay 4813, right back contacts of relays 4812 and 4811, outer left front contact of relay 4813, conductor 6019, outer left back contact of relay 6012, conductor 3923, left back contact of relay 3900, conductor 5314, back contact of relay 5310, conductor 4542, left front contact of relay 4526, left back contact of relay 5249 to the source 5250 of 135-cycle alternating current. Assuming that line 800 is the calling line, that is, that the number has been given correctly, this alternating current will be transmitted over the sleeve contacts and conductors of the line link 801, district link 802 and office link 803 to conductor 1226, lower front contact of relay 1216, through condenser 1202, sleeves of jack 1205 and plug 1206, condenser 1228, middle upper contact of listening key 1207, conductor 1229, left front contact of relay 2142, left back contact of relay 2141, tip contact of cross-point 2150, conductor 2151, inner lower back contact of relay 2004, outer lower front contact of relay 2001, conductor 2034, through the incoming link and connector circuit, conductor 5768 and thence through the winding of relay 4707 to ground. Relay 4707 operates relay 4710 through the resistances 4708 and 4709 and relay 4710 operates relay 4711. Relays 4710 and 4711 disconnect ground from conductor 6023, opening the circuit of relay 5249, to disable the means for indicating a checking failure. Relay 4711 also opens one of the circuits for relay 4608.

Relay 4711 prepares the checking signal by closing at its left front contact a circuit for relay 4605, and at its right front contact a circuit for relay 4610.

When relay 4605 operates it completes a circuit from ground at the inner left front contact of relay 4834, conductor 4871, third left back contact of relay 4000, inner right front contact of relay 4605, right front contact of relay 4608, to the winding of relay 4604 which operates and prepares a locking circuit over its left front contact to ground at the inner left front contact of relay 4607. Relay 4605 also connects ground as above traced over conductor 4614, through the incoming link and connector circuit 2000 to conductor 2036, inner lower contact of relay 2001, to the winding of relay 2002 and battery. Relay 4610, when operated, connects ground from conductor 4871 over the fourth left back contact of relay 4000, outer right front contact of relay 4608, middle left front contact of relay 4610 to the winding of relay 4609 and over conductor 4615 and the incoming link and connector 2000 to conductor 2035, middle lower contact of relay 2001 to the winding of relay 2003. Relays 2002 and 2003 lock over their lower front contacts to conductor 2017 and extend this locking ground over conductors 2036 and 2035 back to the windings of relays 4604 and 4609, respectively, holding these relays operated until their locking circuits are completed.

With relays 4605 and 4604 operated, a circuit is closed from battery through the winding of relay 4009, conductor 4019, left front contact of relay 4605, middle left back contact of relay 3908, outer right front contact of relay 4604, front contacts of relays 4610 and 4609, left back contact of relay 4600, conductor 4616, left back contact of relay 4924, conductor 4934, right back contacts of relays 4601 and 4602, left back contact of relay 3909, outer left back contact of relay 3908, right back contact of relay 3907, left back contact of relay 4603 and ground.

With relay 4711 operated and relay 4609 operated both circuits of relay 4608 are opened and that relay releases. When relay 4608, which is slow to release, closes its left back contact a circuit is closed from battery through winding of relay 4607, back contact of relay 4608 to ground at the left front contact of relay 4609. Relay 4607 provides locking circuits for relays 4609 and 4604 and operates relay 4606. Relay 4606 connects ground over its left front contact to conductor 4617, over the left back contacts of relays 4829 and 4828, conductor 4872 and through the marker connector to the release relay of the terminating sender which releases the sender circuit as well as the marker connector.

Figure 18:
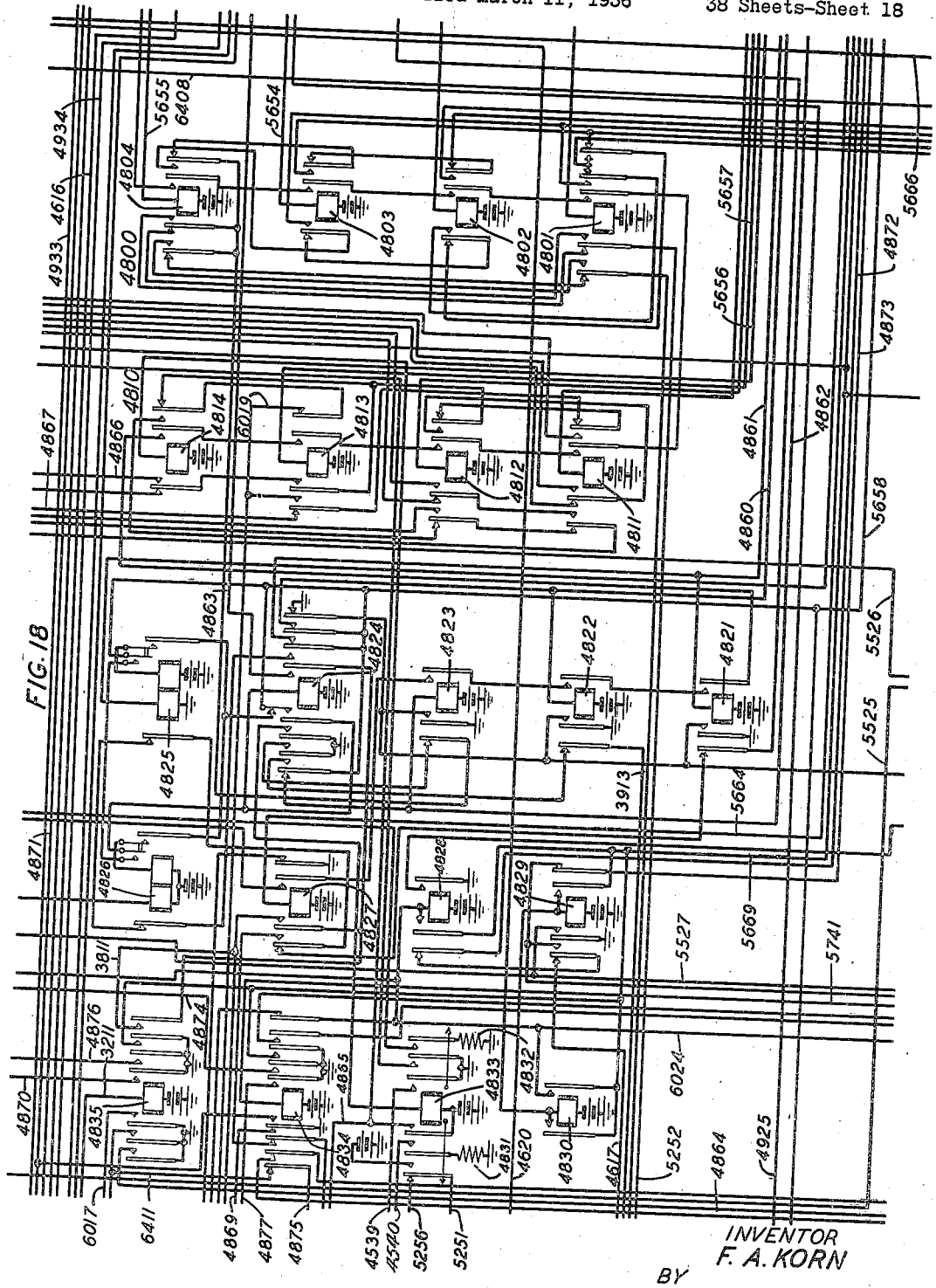
Figure 19:
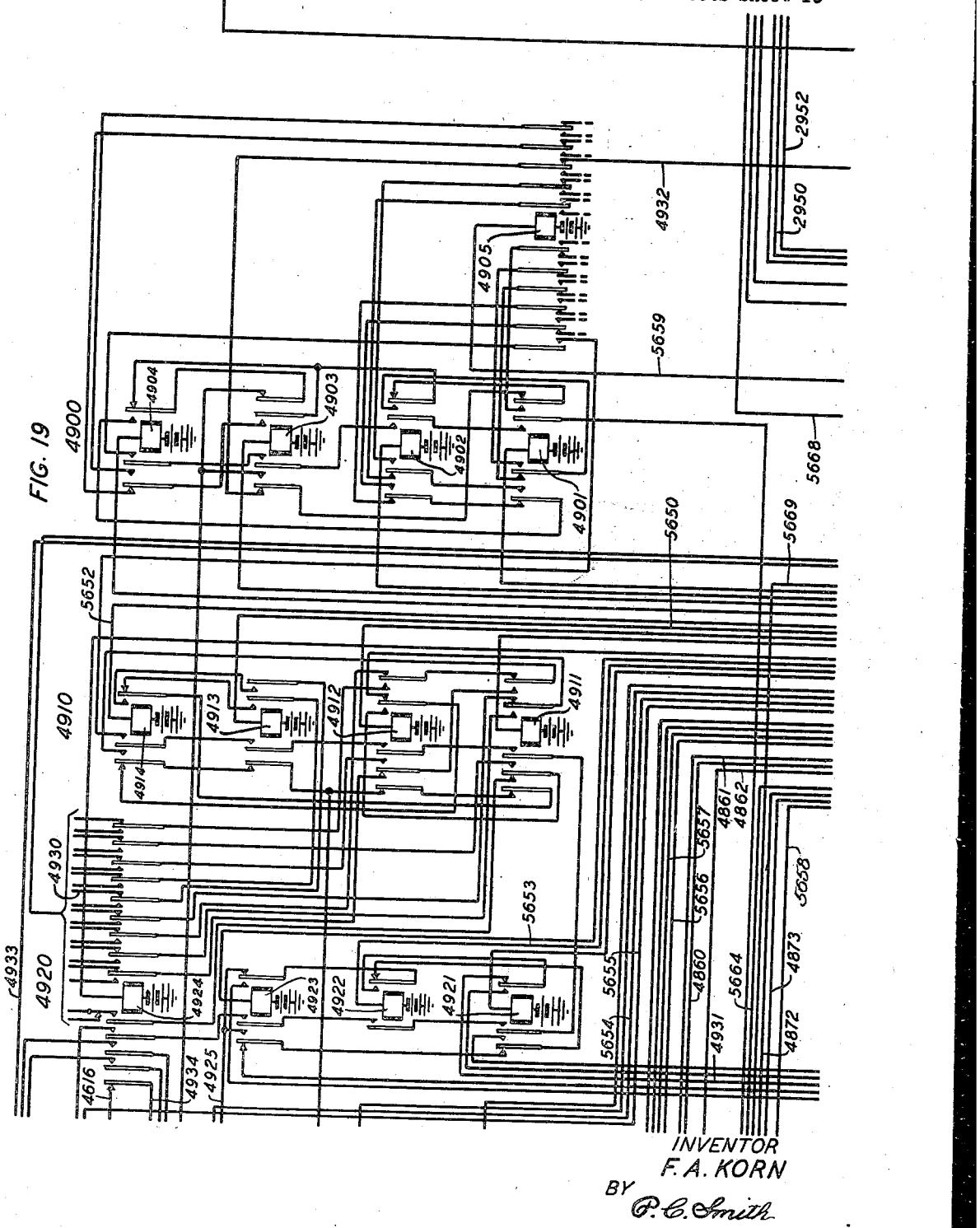

The release of the marker connector releases all of the recording relays of Figs. 18 and 19 as well as relay 4706 which releases the number checking relays. It also disconnects ground from conductor 5658, releasing relay 4824. Relay 4824 opens the circuits of the translator relays 6305, 6304 and 6244. The release of these relays opens the circuit of the line choice connector which releases, opening the circuit of relay 4835, which disconnects ground from conductors 4864, 6411, 6017, 4870, 4876 and 5669, releasing relays 6302, 5303 and 4101.

Relay 4824 disconnects battery from the incoming connector circuit, which disconnects the connector from the marker, releasing all of the connector relays and in turn relay 4834. Relay 4834 disconnects ground from conductors 4871, 4877, 4874 and 5669, releasing any timing relays which may be operated and completing the release of the marker.

With relays 2002 and 2003 both operated a circuit is closed from ground over the upper front contacts of these relays, conductor 2037, lowermost contact of cross-point 2150, to number checking lamp 2143, lighting that lamp steadily as an indication to the "A" operator that the number given was correct. The operator then restores key 2140, releasing relays 2144 and 2142 and hold magnet 2111 thereby releasing the number checking link 2100. With magnet 2111 released, relay 2005 releases, disconnecting ground from conductor 2017 and releasing all of the operated relays of the number checking junctor. The operator proceeds to set up the connection in the usual manner.

If the check is unsuccessful so that relays 4707, 4710 and 4711 are not operated, the operation of relays 5415 and 5249 as above described disconnects the 135-cycle current from the sleeve of the line. After a further interval relay 4705 releases and relay 4712 operates, opening the circuit of relay 4608 which releases slowly to release the marker as above described. Relay 4712 also closes an obvious circuit for relay 4610. Relay 4610 operates relay 2003 as before, but relay 2003 operated alone, connects interrupted ground from conductor 2038 over the back contact of relay 2002, and the front contact of relay 2003 to lamp 2143, thereby flashing lamp 2143 as an indication to the operator that the number failed to check.

In the case of a group of private branch exchange trunks, known as a terminal hunting group, some or all of the relays 5229 to 5239 will be operated from the line choice connector as described in the above-identified Carpenter patent, the number depending on the number of lines in the group. In this case, the 135-cycle current will be connected directly to the first line of the group under the control of the units register. The circuit may be the same as traced for the individual line but for convenience assume that the number recorded is 9280 so that none of the relays of register 4810 is operated and the even tens relay 5241 is operated in place of the relay 5242. In this case the alternating current will be extended as above traced to register 4810 and thence over conductor 4867, over the inner contact of relay 5241, outer right front contact of relay 4526 through condenser 4579, inner left front contact of relay 4522, inner right back contact of relay 4500, to conductor 4552 and the sleeve of the first line of the terminal hunting group. A branch of this circuit will extend to the right armature of relay 5229, over the front contact of that relay, to the armature of the next relay of that group, and through the next condenser and another contact of relay 4522 to the sleeve of the next line. Similarly the alternating current is passed to the third line over the front contact of the second relay and so on. If any one of the lines of the group is connected to the operator's position, the checking circuit will be completed and relay 4707 will operate.

If the group extends into another block of twenty lines, relay 5239 will be operated, and the checking current will be extended to condenser 5254 and the full wave rectifier 5245 which feeds relay 5247 in parallel with resistance 5246. With relay 4704 operated, relay 5415 is operated as above described. This relay is slow to operate and if the calling line is in the first twenty-block, the operation of relays 4707, 4710 and 4711 renders relay 5415 ineffective. If the check is unsuccessful in the first twenty-block, when relay 5415 operates, with relay 5247 operated, a circuit is closed from ground, back contact of relay 4710, left back contact of relay 4711, conductor 6023, back contact of relays 6010 and 6011, front contact of relay 5415, front contact of relay 5247, winding of relay 4530 and battery. Relay 4530 closes a holding circuit over its alternate contact to ground at the right contact of relay 4534 which operates as above described. With relay 4530 operated, assuming that relay 5300 is operated from the translator in the manner previously described for relay 5308, a circuit is closed from battery through the winding of relay 5301, uppermost front contact of relay 5300, upper back contacts of relays 5302, 5304, 5306 and 5308, conductor 5315, right front contact of relay 4530, conductors 4545 and 4864 to ground at the outer left contact of relay 4835. Relay 5301 locks over its upper front contact, conductor 6321, outer right back contact of relay 6012, conductor 6017 to ground at the inner left contact of relay 4835. Relay 5301 opens the circuit of the hundred-block and twenty-block relays in the line choice connector thereby releasing relay 4535 to shunt relay 4534 and in turn release relay 4530. With relay 5301 operated and relay 4530 released, relay 5302 is operated through its upper winding, inner lower front contact of relay 5301, inner lower back contacts of relays 5303, 5305, 5307, 5309, conductor 4546, right back contact of relay 4530 to ground over conductors 4545 and 4864. Relay 5302 then closes the circuit for the new hundred-block relay and twenty-block relay continuing the test on the next twenty lines. Similarly any additional lines are tested, the operation being essentially the same as described in the above-identified Carpenter patent, except that it is controlled by relay 5415 instead of by relay 4534. The release of relay 4535 also releases relay 4536 which opens the circuit of relay 5415 which releases in turn to restart the interval for testing the next group of lines.

If a private branch exchange has, in addition to its two-way lines, a group of lines used only for outgoing service, the marker will not normally have access to this group. Since one of these lines may be one to originate a call requiring number checking, relay 4706 in operating closes a circuit from ground at its inner right contact, conductor 4723, to a relay in the line choice connector. With this relay operated, the line which is normally wired as the last line of the group, is transformed into an intermediate line so that it operates relay 5239, and the additional group is checked in the same manner as the other lines.

*Number checking by toll operator*

Assume that the subscriber at substation 800 desires a connection requiring the services of the toll operator. He will be connected over line link 801 to an idle district junctor and sender 804, will dial the appropriate code and be connected over the district link 802 and office link 803 to a trunk leading to the toll position. When the trunk has been selected the sender will establish a bridge across the tip and ring conductors leading to the toll trunk, completing a circuit from battery through the right winding of relay 502, inner left back contact of relay 515, right back contact of relay 514, upper left winding of repeating coil 524, tip conductor 538, through the office and district links and the bridge in the sender back through the district and office links to ring conductor 539, lower left winding of repeating coil 524, left back contact of relay 514, right back contact of relay 515, left winding of relay 502 to ground. The sender recognizes the closure of this circuit and operates a relay in the district junctor thereby establishing a substitute bridge across conductors 538 and 539 and permitting the release of the sender.

Relay 502 closes a circuit from ground at is contact, over the normal contacts of relay 521 through the winding of relay 503 to battery. Relay 503 reverses the connections with the right windings of repeating coil 524, connects ground over its inner right contact, normal contacts of relay 518 and retard coil 520 to conductor 540 to hold the district and office link switches. Relay 503 also closes an obvious circuit for relay 518 which at its left contact closes a substitute holding ground to conductor 540. Relay 518 also operates relay 519 which in turn operates relay 506.

Relay 506 connects ringing current from source 508, through resistance 507, inner right contact of relay 506, left back contact of relay 517, condenser 541 to conductor 539 as an indication that the operator is being signaled. Relay 506 also connects battery and ground to the two wires of the toll trunk and connects the alternating curren relay 504 and condenser 505 across the trunk conductors. The circuit over the trunk may be traced from battery through the left winding of relay 510 and the right winding of relay 509, outer left contact of relay 506, outer left front contact of relay 503, lower right winding of repeating coil 524, over the ring conductor of the trunk to the toll position, lower back contact of relay 525, lower left winding of repeating coil 527, right back contact of relay 542, windings of relay 526, left back contact of relay 542, upper left winding of repeating coil 527, upper back contact of relay 525, over the tip conductor of the trunk back to the originating office, upper right winding of repeating coil 524, inner left front contact of relay 503, outer right contact of relay 506, left winding of relay 509, right winding of relay 510 to ground. Neither relay 509 nor relay 510 operates at this time, but relay 526 at the toll position does operate. Relay 526 closes a circuit from ground over its front contact, winding of relay 543 and battery. Relay 543 lights lamp 537, from battery over the back contact of relay 532, indicating to the toll operator, the presence of an incoming call.

The operator then inserts plug 629 of an idle cord circuit in the jack at which the lamp appears, closing a circuit from battery through lamp 626, inner upper right normal contact of key 622, sleeves of plug 629 and jack 536, right winding of relay 533, left winding of relay 531 to ground. The resistance of these windings of relays 531 and 533 is high enough to prevent the lighting of lamp 626, but relays 531 and 533 operate, relay 531 in turn operating relay 532. Relay 532 opens the circuit of lamp 537, extinguishing it. It also connects battery to the upper right winding of repeating coil 527 through resistance 528 and to the winding of relay 542 through resistance 546. However, with relay 533 operated the winding of relay 542 is shunted by direct ground over the front contact of relay 533. In addition relay 532 connects a shunt around the lower high resistance winding of relay 526 and connects condenser 545 between the left windings of repeating coil 527.

The reduced resistance in the trunk circuit produced by shunting the winding of relay 526 permits marginal relay 509 to operate, in turn operating relay 517. Relay 517 closes a holding circuit for relay 518 and disconnects the ringing current from conductor 529. It also closes a circuit over its left front contact and the outer left back contact of relay 515 to the winding of relay 515 and battery. Relay 515 operates and locks under the control of relay 518, reversing the connection of relay 502 to the office and district links indicating to the district junctor that the operator has answered.

Figure 6:
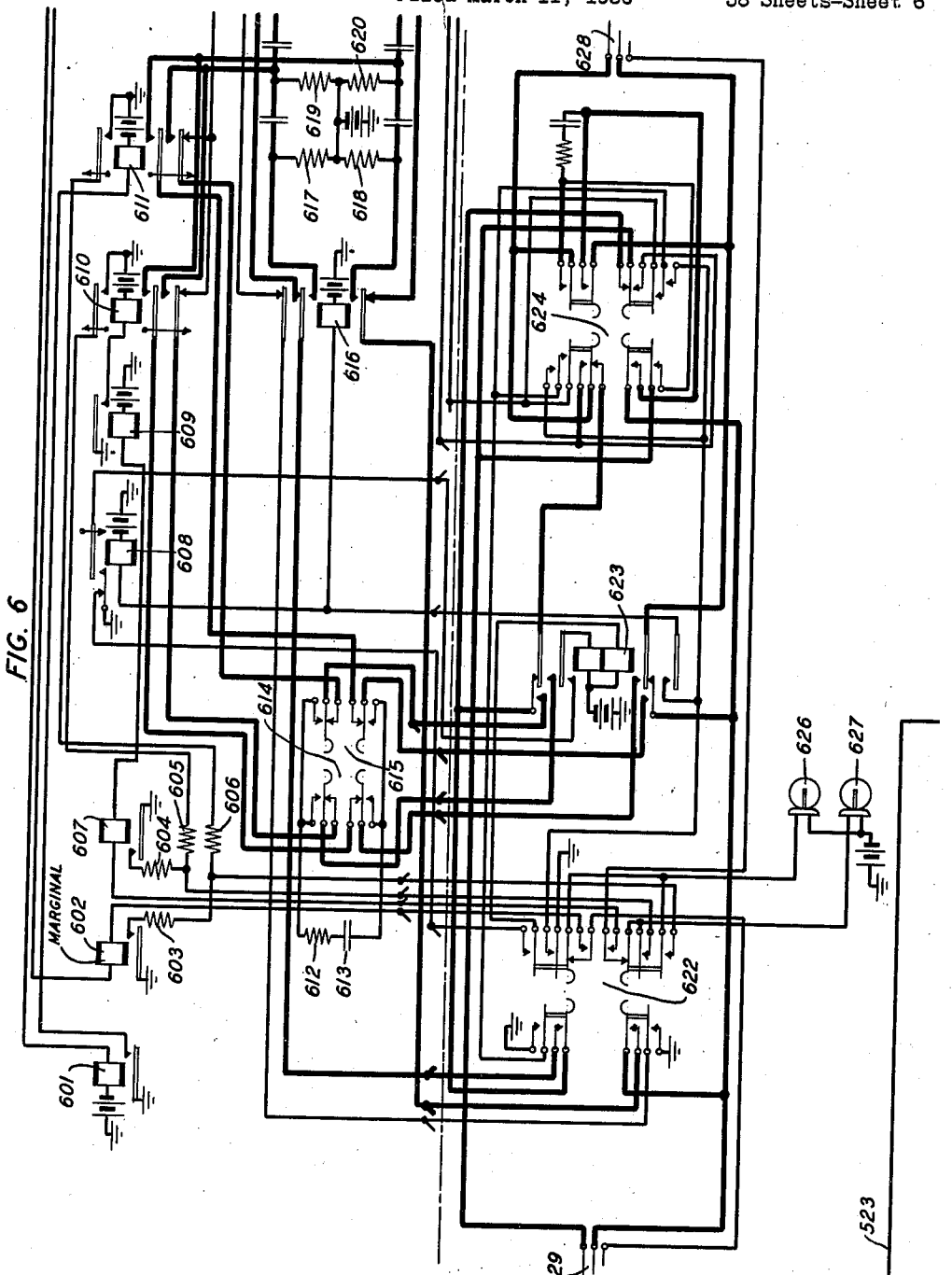
Figure 7:
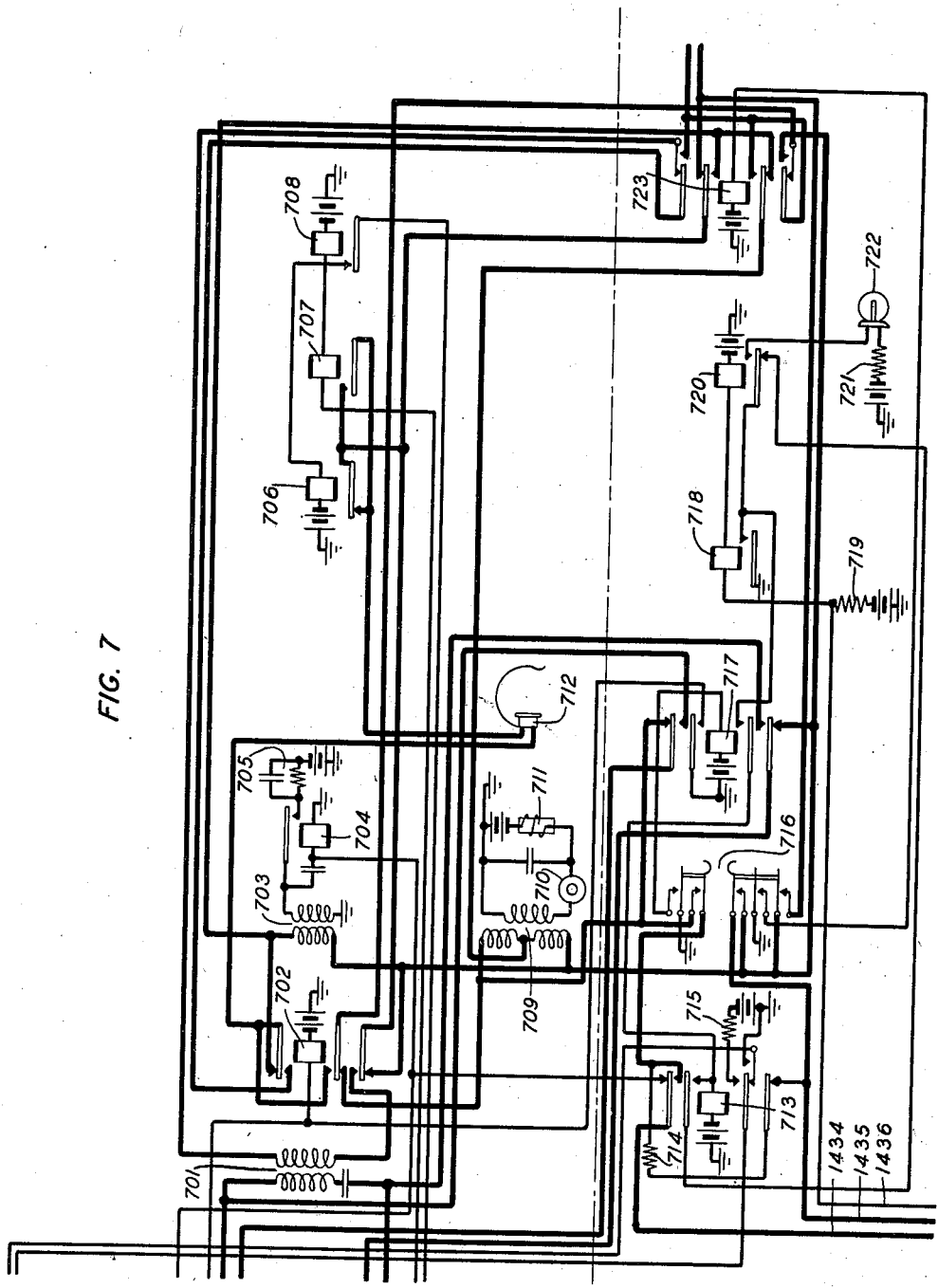

The operator then throws her listening key 622 to the right or talking position. Assuming that the position circuit shown at the top of Fig. 6 is idle, a circuit is closed from battery through the lower winding of relay 623, uppermost right contact of key 622, normal contact of relay 608 and ground. Relay 623 operates, closing a circuit from ground over the middle upper contact of key 622, outer lower front contact of relay 623, to battery through the windings of relays 608 and 616. Relay 608, at its make-before-break contact closes a locking circuit for relay 623 extending from battery through the upper winding and over the inner upper front contact of relay 623 to ground at the front contact of relay 608. Relay 608 then opens the operating circuit of relay 623 as well as those of the corresponding relays of the other cord circuits at this position. The operation of key 622 also transferred the circuit of relays 531 and 533 from lamp 626, over the inner upper right alternate contact of key 622, to the winding of relay 602 and thence over the inner lower back contact of relay 713 to the winding of relay 601 and battery. Relay 601 operates in this circuit but relay 602, being marginal does not. Relay 601 in turn operates relay 611. Relay 611 extends the tip and ring conductors of the cord over contacts of relay 623, normal contacts of key 615, lower front contacts of relay 611 and back contacts of relay 717 to the left winding of repeating coil 709 in the operator's headset.

The operator then asks the calling subscriber for his number and the details of the call to be completed. She then proceeds to check the accuracy of the calling number as given. To do so, she first operates the listening key 716 of the number checking cord shown in the lower half of Fig. 7. The operation of this key closes obvious circuits for relays 717 and 723. Relay 717 in turn operates relay 702 in the operator's telephone circuit. With relays 717, 723 and 702 operated the talking connection between the cord of Fig. 6 and the operator's telephone is opened at relay 717 and extended over the front contacts of relay 717 to the left winding of repeating coil 701. The right winding of repeating coil 701 is connected to the operator's receiver, the circuit extending from the upper end of coil 701, outer upper and inner lower front contacts of relay 723, lower left winding of repeating coil 709, outer lower front contact of relay 723, inner lower front contact of relay 702, through receiver 712, back contact of relay 706, outer lower front contact of relay 702 to the lower side of coil 701. The lower left winding of coil 709 is of high resistance and does not receive sufficient current from the transmitter 710 to permit conversation to take place on this connection.

At the same time the operation of key 716 connects the tip conductor 1434 of the number checking cord over the outer upper front contact of relay 713, when that relay operates, and the inner upper contact of key 716 through the left windings of coil 709, inner lower contact of key 716 to the ring conductor 1435. The receiver 712 is connected in series with the lower left winding of coil 709 as above described, providing a talking connection with the number checking cord.

The operator then takes up plug 1433 of the number checking cord and tests for an idle number checking trunk to the originating office in the usual manner. Having found an idle trunk she inserts plug 1433 in the jack of that trunk, for example jack 1316, closing a circuit from ground through the two windings of relay 1311, sleeves of jack 1316 and plug 1433, conductor 1436, windings of relays 719 and 720 to battery. The resistance of the upper winding of relay 1311 is so large as to prevent the operation of relay 720, but relays 719 and 1311 operate.

Relay 719 closes a circuit from ground over its contact, inner lower front contact of relay 717, winding of relay 713 and battery. Relay 713 locks over its inner upper front contact, back contact of relay 720 to ground at the contact of relay 719. Relay 713 completes the talking connection with plug 1433, above described, connects battery through resistance 715, through the winding of relay 602 and the inner upper right operated contact of key 622 to the sleeve of plug 629 to hold that connection. It also connects ground to the winding of relay 601 to hold that relay operated.

Resistance 715 is high enough to cause marginal relay 533 to release, opening the shunt around relay 542 which now operates. Relay 542 at its inner left contact closes a holding circuit for relay 543. It also disconnects relay 526 from the interoffice trunk and extends the upper left winding of repeating coil 527 over the left front contacts of relays 542 and 543 to ground through the lower winding of retard coil 544, and the lower left winding of coil 527 over the right front contacts of relays 542 and 543 to battery through the upper winding of coil 544. The battery supplied by coil 544 is sufficiently higher than that connected to the windings of relay 510 to reverse the current flow through relay 510 and cause it to operate. Relay 510 operates relay 521 which closes a holding circuit for relay 517, and a locking circuit for relay 503, and connects sleeve conductor 549 over the outer left contact of relay 521 through condenser 522 to conductor 523 to prepare the number checking circuit.

Relay 1311 connects ground over its inner lower contact to the winding of relay 1313 which operates, connecting the windings of relay 1312 to the left windings of repeating coil 1315. Since relay 1311 is operated, the high resistance lower winding of relay 1312 is shunted, connecting a low resistance bridge across the conductors 1317 and 1318 outgoing to the originating office where conductor 1317 extends through the upper right winding of repeating coil 1308, upper back contact of relay 1306, upper winding of relay 1305 to ground and conductor 1318 extends through the lower right winding of coil 1308, lower back contact of relay 1306, lower winding of relay 1305 and battery. Relay 1305 operates but current flow is not in the proper direction to operate polarized relay 1312.

Relay 1305 operates relay 1304 which connects ground over the back contact of relay 1307 to conductor 1319 leading to the terminating sender link and control circuit 2013 which functions as described in the patent to W. W. Carpenter et al., No. 2,089,338, granted Aug. 10, 1937, to connect the trunk with a B operator's sender.

Assuming that the sender link selects the sender of Figs. 28, 29, 30 and 38, it connects ground to conductor 2823, operating relay 2802 which in turn operates relay 2801. Relay 2801 connects the ten frame relays 2810 to 2816 and 2917 to 2919 through to the link, while relay 2802 connects relays 2803 and 2804 to the link. These relays receive the indication of the frame on which the incoming trunk is located, relays 2803 and 2804 receiving the tens digit and the remaining relays receiving units digit of the frame number which may be anything from 0 to 19. Assuming for convenience that the number checking trunk is located on frame No. 0, relays 2804 and 2810 will be operated by ground from the link.

Relay 2802 connects conductors 2830 and 2840 together operating a relay in the link circuit which grounds conductor 2824. Relay 2802 also connects relay 2921 to conductor 2824, relay 2921 closing locking ground for relays 2804 and 2810 over the inner upper normal contacts of release relay 2809 and the second left contact of relay 2921. Relay 2921 also supplies locking ground for other relays as will appear hereinafter.

Relay 2921 connects ground to conductor 2928, leading to the link circuit where it operates a relay which returns ground on conductor 2929, extending over the outer left front contact of relay 2921, over the outer lower front contact of the operated frame relay 2810, through the winding of relay 2805 to battery. Relay 2805 connects ground over its inner upper front contact to the winding of relay 2921 to hold that relay operated after relay 2802 releases. Relays 2921, 2805 and the link relay therefore mutually maintain the connection between the link and the sender.

Relay 2805 extends its operating ground to conductor 2830 over which it holds the primary and secondary link switches and over the inner right contact of relay 2802 to conductor 2831 which causes the release of the link control circuit. When the control circuit releases, relays 2802 and 2801 release. When relay 2805 operates, it connects ground from the upper back contact of relay 2807, through the upper winding of relay 2806, two outer upper front contacts of relay 2805 to conductor 2832 which is connected by the terminating sender link to conductor 1321, the winding of relay 1307 and battery. Battery through the lower winding of relay 2806 is connected over the next to outer upper contact of relay 2805 to conductor 2832 but relay 2806 is differentially wound so that it does not operate in series with the battery at relay 1307. However, relay 1307 operates and locks over its upper front contact to ground at the front contact of relay 1304. This ground extends back over conductors 1321 and 2832 to relay 2806 which now receives current in the proper direction to operate. Relay 2806 closes a circuit from battery through the winding of relay 2807, front contact of relay 2806 to ground at the next to inner upper contact of relay 2805. Relay 2807 locks to this ground independent of relay 2806 and disconnects ground from the upper winding of relay 2806. Relay 2806 therefore is held operated under the control of the toll operator and serves to signal a preliminary disconnect if one should occur.

As soon as the sender has been connected with the trunk, ground from the lower back contact of relay 1307 extends over conductor 1320 through the terminating sender link to conductor 2833 which extends to the marker connector as will appear hereinafter and over the lower back contact of relay 2807 to conductor 2835, left winding of relay 3824 and battery. Relay 3824 locks in a circuit from battery through its right winding and right front contact, conductor 3831 to ground at the outer right front contact of relay 2921. Relay 3824 grounds conductor 3832 leading to the marker connector indicating to that circuit that a special marker must be selected. This relay does not indicate the particular type of special call which is to be handled.

When relay 1307 is operated, as above described, it disconnects ground from the start circuit of the link control circuit, prepares locking circuits for relays 1302 and 1303 and transfers conductor 1320 from ground to the winding of relay 1301.

Relay 2804 in operating initiates the search for an idle operator's position. It closes a circuit from ground at its inner upper front contact, conductor 2825, outer left back contact of relay 2923, outer upper back contact of relay 2820, conductor 2826, right back contact of relay 3823, conductor 2827, outer lower back contact of relay 2821, conductor 2828, winding of relay 3822 and battery. Relay 3822 closes a circuit for the test relay 3823 from ground at the contact of relay 2804 to conductor 2826 as above traced, through the right winding of relay 3823, outer left front contact of relay 3822 to battery through the left winding of relay 3823 preparing relay 3823 to operate promptly when an idle position is found, but preventing its operation should two senders test the same position simultaneously. Relay 3822 also prepares the test circuit extending as above traced through the right winding of relay 3822 and over the inner left contact of relay 3822, middle winding of relay 3823, conductor 3825, outer left back contact of relay 2925, inner left back contact of relay 2923, upper back contact of relay 2822, outer upper back contact of relay 2809, upper normal contacts of relay 2808, conductor 2829 to brush 2903.

Relay 3822 also closes a circuit from battery through the winding of relay 3821, conductor 3826, back contact of stepping magnet 2907 of the position finder 2900, conductor 3827, outer right back contact of relay 3820, right front contact of relay 3822, left back contact of relay 3823, conductor 3828, lower back contact of relay 2822, inner lower normal contacts of relay 2821, outer left back contact of relay 2923, conductor 2825, to ground at the inner upper front contact of relay 2804. Relay 3821 closes a circuit from battery through the winding of magnet 2907, conductor 3829, front contact of relay 3821, conductor 3827 and thence to ground over the operating circuit of relay 3821. Magnet 2907 operates, opening the circuit of relay 3821 which releases in turn releasing magnet 2907 which advances switch 2900 one step and recloses the circuit of relay 3821. This cycle repeats itself until an idle position is found.

Assuming that the position of Fig. 37 is occupied and idle, the test circuit from relay 3823 will extend over conductor 2926, resistance 3735, outer right back contact of relay 3734, left contact of key 3702 to battery at the inner left front contact of relay 3721 which operated in the usual manner when headset 3708 was inserted in position jack 3709. Relay 3823 operates in the test circuit and locks in a circuit from battery in the position circuit to conductor 3825, middle winding and right front contact of relay 3823 to ground over conductor 2826 as before. This locking ground marks the position busy to other senders.

Relay 3823 also opens the circuits of relays 3822 and 3821 thereby preventing the reoperation of the stepping magnet 2907 and leaving the brushes of switch 2900 in engagement with the selected position. Relay 3822 after an interval opens the operating circuit of relay 3823 and closes a circuit from ground on conductor 3828 as previously traced, left front contact of relay 3823, right back contact of relay 3822, winding of relay 3820 and battery. Relay 3820 after an interval further opens the circuit of relay 3821 and magnet 2907. Relay 3820 also closes a circuit from grounded conductor 2825, left back contact of relay 2923, conductor 2927, outer left front contact of relay 3820, left front contact of relay 3823, right back contact of relay 3822 to the winding of relay 3820, locking under the control of relay 3823. This locking ground also extends over the inner left contact of relay 3820, conductor 3830 to the winding of relay 2821. Relay 2821 at its inner lower contact locks over the outer left back contact of relay 2923, conductor 2825, and ground at the inner upper front contact of relay 2804.

When relay 2821 operates, a circuit is closed from battery through the winding of relay 2913, upper front contact of relay 2821 and in parallel therewith, from battery through the winding of relay 2912, outer lower front contact of relay 2807, inner upper contact of relay 2820, outer lower front contact of relay 2821, outer left back contact of relay 2923 to grounded conductor 2825. Relays 2913 and 2912 in operating complete a circuit from battery through the upper windings of relay 2911 and retard coil 2910, outer upper front contact of relay 2912, lower back contact of relay 2820, outer upper front contact of relay 2913, brush 2901, winding of relay 3704, brush 2902, outer lower front contacts of relays 2913 and 2912, lower windings of coil 2910 and relay 2911 to ground.

Relay 3704 at its right contact connects the left winding of coil 3707 across the talking conductors and at its left contact closes a circuit from battery, inner left contact of relay 3721, left contact of relay 3704, winding of relay 3734 and ground.

Relay 3734 initiates the generation and transmission of the "zip" tones to the toll operator in the well-known manner, operating relays 3722, 3723, 3724 and 3703 in succession, relay 3703 releasing relays 3722 to 3724 and connecting the left windings of repeating coil 3701 to the talking circuit to permit the toll operator to give the "B" operator the wanted number. The talking circuit extends from the "B" operator's headset, coil 3701, contacts of relay 3703, brushes 2901 and 2902, contacts of relays 2913 and 2912, through condensers 2932 and 2933 to conductors 2930 and 2931 connected by the terminating sender link to conductors 1322 and 1323, repeating coils 1308 and 1315, jack 1316 and plug 1433, conductors 1434 and 1435, contacts of relay 713 and key 716 to repeating coil 709 and the toll operator's headset.

Relay 3734 closes a flashing circuit for lamp 3736 which is shunted by a steady circuit when relay 3703 operates. When relay 3734 operates it disconnects battery from conductor 2926, releasing test relay 3823 which in turn releases relay 3820.

With relays 3704 and 3734 operated, battery is connected over the inner left contact of relay 3721, left contact of relay 3704 to the left armatures of relay 3733 and thence through the high resistance 3739 and low resistance 3737, inner right front contact of relay 3734, brush 2906, inner right back contact of relay 3820, conductor 3833, inner lower front contacts of relays 2913 and 2912, winding of relay 2201, inner right normal contacts of relay 2202, left winding of relay 2209, inner right normal contacts of relay 2212, left winding of relay 3003, right winding of relay 3002 to ground. Relays 2201, 2209 and 3002 operate in this circuit. Due to the inclusion of high resistance 3739, relay 3003 does not operate. A parallel circuit extends through high resistance 3740, low resistance 3738, brush 2905, middle upper contacts of relays 2913 and 2912, winding of relay 2208, and thence over the inner right normal contacts of relay 2202 to ground over the circuit traced through relay 2201. Relay 2208 operates in this circuit in addition to the relays already recited to be operated. With relays 2201 and 2208 both operated a circuit is closed from battery through the left winding of relay 2202, front contacts of relays 2201 and 2208, conductor 2834 to ground at the middle lower contact of relay 2805. Relay 2202 closes a locking circuit for itself from grounded conductor 2834, right winding and right front contact of relay 2202 to the windings of relays 2201 and 2208 and battery as supplied by the position circuit, at the same time opening the circuit of relays 2209, 3003 and 3002 and releasing them. Relay 2202 prepares the sender to receive the registration by connecting ground from conductor 2834 over its left front contact to the windings of relays 2203 and 2210 and battery. Relay 2203 closes a locking circuit for the two relays to conductor 2834 and extends the ground to relays 2204 and 2211. These relays lock in turn and operate relays 2205 and 2212 which also lock. Relay 2205 operates relay 2206. With relays 2210 to 2212 operated, a circuit is closed from battery through resistance 2214, right back contact of relay 2213, left winding of relay 3804, inner left front contacts of relays 2210, 2211 and 2212, right winding of relay 2209, inner upper front contacts of relays 2912 and 2913, brush 2904, winding of relay 3729, left back contact of relay 3730, right back contact of relay 3727, key 3720 and ground. Relay 3729 operates and locks over its outer left contact, conductor 3742, outer left front contact of relay 3734, outer right front contact of relay 3721 to ground. Relay 3729 also extends ground from conductor 3742 over its inner left contact through the winding of relay 3730 to battery over conductor 3741. Relay 3730 locks over its left front contact, right back contact of relay 3727 to ground on key 3720. It also extends ground from conductor 3742 to the winding of relay 3733 and battery. Relay 3733 opens the circuit of relay 3727 and disconnects direct battery from resistances 3737 to 3740.

This disconnection of battery releases relays 2201, 2208 and 2202. When relay 2202 releases, it connects ground from conductor 2834 over its left back contact, conductor 2215 and the right front contact of relay 2206 to the winding of relay 2213 and battery. Relay 2213 locks to ground over conductor 2215 and disconnects battery from the circuit of relay 3729 connecting ground to the windings of relays 3804 and 3804 from conductor 2215. With battery disconnected from its winding, relay 3729 releases, extinguishing lamp 3743 as an indication that the sender is ready for registration. It also closes a branch of its operating circuit through the left winding of relay 3728, right back contact of relay 3729, inner right front contact of relay 3730 to resistances 3732 and 3731 and the key-set 3700.

When the "B" operator sees lamp 3743 go out, she operates her key-set. Assuming that the number given by the calling subscriber and passed by the toll operator to the "B" operator is 9299, she will operate keys 3719, 3712, 3719 and 3719 to write up this number on her key-set. The operation of key 3719 closes a circuit from battery on conductor 3741, upper contact of key 3719 through high resistance 3731 and low resistance 3732 through the left winding of relay 3728 and thence as above traced through the windings of relays 2209 and 3804 to ground, operating relays 3728 and 2209, but not operating relay 3804. Relay 3728 makes a peg count record of a call handled. A second circuit is closed from battery over the lower contact of key 3719, through resistances 3740 and 3738 and thence as previously traced through the windings of relays 2208 and 2209, over the inner right front contacts of relays 2212, 2211 and 2210 to the right windings of relays 3803 and 3802. Relays 2208, 2209 and 3802 operate. Relay 3802 locks to conductor 2215. Relay 2208 closes a circuit from grounded conductor 2834, contact of relay 2208, right back contact of relay 2202, outer right front contacts of relays 2212, 2211 and 2210, winding of relay 3801 and battery. Relay 3801 locks through resistance 3805 to conductor 2215. Therefore relays 3801 and 3802 are operated in thousands register 3800. Relay 2209 in operating closes a circuit from grounded conductor 2215 over the front contact of relay 2209, outer left front contacts of relays 2212, 2211 and 2210 to the winding of relay 2210 in shunt of the winding of relay 2203, releasing relay 2203 and holding relay 2210 over its front contact. When the operator releases the key, relays 2209 and 2210 release transferring the registering circuits to the hundreds register 3020.

The operation of key 3712 connects battery over its upper contact through low resistance 3732 to the windings of relays 2209 and 3024 and over its lower contact through resistances 3739 and 3737 to the windings of relays 2201, 2209, 3023 and 3022. Relays 2201, 2209, 3024 and 3022 operate in these circuits. Relays 3022 and 3024 lock to conductor 2215. Relay 2209 releases relays 2204 and 2211 in the manner previously described.

The next two digits cause the operation and locking of relays 3011 and 3012 in the tens register and relays 3001 and 3002 in the units register. At the end of the tens digit registration, relays 2212 and 2205 are released and at the end of the registration of the units digit relay 2206 is released. With relay 2206 released, as soon as relay 2209 releases in response to release of the key, a circuit is closed from grounded conductor 2215, back contact of relay 2209, outer left contact of relay 2213, back contact of relay 2206, winding of relay 2820 and battery. Relay 2820 locks over its inner lower contact to grounded conductor 2834. It opens the circuits of relays 2913 and 2912 which release, opening the circuit of relay 3704 which releases, in turn releasing relays 3728, 3730, 3733, 3734 and 3703, restoring the position circuit to normal.

Relay 2820 also connects battery over the lower normal contact of relay 2809, outer lower front contact of relay 2820, inner right back contact of relay 2923 to conductor 2934 leading to the marker connector and in parallel with conductor 2934, over the normal contact of relay 3814 to conductor 2935.

When the connection between the sender and the marker has been established, ground on conductor 3832 is extended to conductor 5672 to operate the special call relay 4706. At the same time the registration is transferred from the sender to the marker by grounding certain conductors under the control of the register relays. With relays 3801 and 3802 of the thousands register 3800 operated, relay 3811 of the auxiliary register is operated over the left front contact of relay 3802, inner right front contact of relay 3801, inner left back contact of relay 3804 and grounded conductor 2215. Relay 3813 is operated over the inner right back contact of relay 3803, right back contact of relay 3804 and grounded conductor 2215. Relays 3811 and 3813 ground conductors 3841 and 3843.

With relays 3022 and 3024 operated, conductor 3026 is grounded over the right back contact of relay 3021, right front contact of relay 3022, and the inner left back contact of relay 3023. Conductor 3016 is grounded over the back contact of relay 3014 and conductor 3017 over the outer left front contact of relay 3011, right front contact of relay 3012 and the inner left back contact of relay 3013. Similar circuits closed by the units register relays ground conductors 3006 and 3007.

At the same time all the conductors for transferring registrations are tested by the connection of ground from the marker connector over conductor 5658 and the outer left and inner and middle right back contacts of relay 4824 to conductors 4862, 3861 and 4860 which are connected by the marker connector to conductors 2962, 2961 and 2960, respectively. Ground from these conductors is extended to the unused registration conductors and over them to the register relays of the marker. Taking the units register 3000 by way of example, conductors 3006 and 3007 were grounded directly. Conductor 3008 receives ground over the right front contact of relay 3001, outer left front contact of relay 3002, outer left back contact of relay 3003 and conductor 2961, while conductor 3009 receives ground over the outer left front contact of relay 3002, outer left back contact of relay 3003 and conductor 2961. Similar circuits may be traced for the other unused registration conductors.

Frame register relays 2804 and 2810 are operated, neither of which grounds a frame registration lead directly, but ground from conductor 2960 is connected over the outer upper contact of relay 2810 to conductor 2836, from conductor 2961 over the middle lower contact of relay 2810 to conductor 2837 and from conductor 2962 over the middle upper contact to conductor 2838 and over the inner upper contact to conductor 2839. Ground from conductor 2962 is also connected over the outer upper front contact of relay 2804 and the back contact of relay 2803 to conductor 2841. Another branch of grounded conductor 2962 extends over the back contact of relay 2925 toward the marker.

When the registration has been made and the line choice connector 806 operated, relay 4835 is operated in turn operating relay 4113. When relay 4835 operates, the incoming link and connector 1300 is operated followed by relay 4834. With relays 4113 and 4834 operated, a circuit is closed from ground at the second right contact of relay 4834, conductor 4874, front contact of relay 4113, conductor 5666, through the marker connector to conductor 2833 and through the terminating sender link, to conductor 1329, outer lower front contact of relay 1307 to the winding of relay 1301 and battery. Relay 1301 connects the number checking incoming junctor to the incoming connector and overconductor 1328 operates a relay which establishes the connection between the marker and the junctor. Over conductor 1329 relay 1301 extends ground through the connector to conductor 4722, outer right contact of relay 4706 to the winding of relay 4704 to indicate that a number checking connection is desired.

The connection to the marker and the functioning of the marker are the same as previously described. When the marker connects the 135-cycle current to the sleeve of the line a circuit is closed from source 5250, over the circuit previously traced through the units register to condenser 4569, inner left front contact of relay 4525, inner right back contact of relay 4519, conductor 3219, through the line choice connector 806 to conductor 805, and, if the number has been given correctly, over the sleeve contacts of the line link, district link and office link to conductor 540, outer left front contact of relay 521, condenser 522, conductor 523, outer lower contact of relay 1301, through the incoming link and connector circuit 1300 to conductor 5768 and through the winding of alternating current relay 4707 to ground. As before relay 4707 causes the operation of relays 4605 and 4610 to ground conductors 4614 and 4615, which extend through the incoming link connector 1300 to conductors 1324 and 1325 operating relays 1302 and 1303. These relays lock to ground at the inner lower front contact of relay 1307. With both relays 1302 and 1303 operated, a circuit is closed from ground over the outer upper front contact of relay 1302, upper front contact of relay 1303, winding of relay 1306 and battery. Relay 1306 reverses the connection between relay 1305 and relay 1312, now operating polarized relay 1312. Relay 1312 operates relay 1310 which in turn operates relay 1309. Relay 1309 connects ground over the inner upper contact of relay 1311 in shunt of its high resistance upper winding, thereby reducing the resistance in the sleeve circuit sufficiently to operate relay 720 which lights lamp 722 steadily to indicate that the number checked properly.

As described above, if the number is not correct and relay 4707 is not operated, relay 4610 is operated alone, causing the operation of relay 1303 which connects interrupted ground from conductor 1326 over the back contact of relay 1302 and the upper front contact of relay 1303 to relay 1306, thereby intermittently operating relay 1306 which causes the flashing of lamp 722 as a signal that the number check was unsuccessful.

As described in the previous case, when relay 4707 operates in response to a correct check it operates relays 4710 and 4711 in turn. With relays 4711, 4604 and 4609 operated, relay 4608 releases and relays 4607 and 4606 are operated. Relay 4606 closes a circuit from ground at its front contact over conductor 4617, left back contact of relay 4829, back contact of relay 4828, conductor 4872 and through the marker connector to conductor 2972, winding of relay 2809 and battery. Relay 2809 locks under the control of relay 2921, opens the locking circuit for the frame register relays, releasing relays 2804 and 2810, and disconnects battery from the marker connector 2700 to release that circuit.

In case the number does not check the circuit of relay 4608 is opened by relays 4609 and 4712 as above described and conductor 4872 is grounded to operate sender release relay 2809.

The release of the frame relay 2810 releases relay 2805 which in turn releases relays 2806, 2807, 2820 and 2921. It also disconnects ground from conductor 2830 to release the link switches. Relay 2805 also opens the locking circuit for the numerical register relays. The release of relay 2921 releases relay 2809 and removes ground from conductor 2928 to remove the busy indication in the terminating sender link and control circuit 2013. Relay 2804 in releasing restores relay 2821, thereby completing the restoration of the sender.

The release of the marker connector 2700 opens the circuit of relay 1301 which disconnects the junctor from the marker. The trunk is held, maintaining the signal until the toll operator removes plug 1433 from jack 1316. This action releases relay 1311 which removes the shunt from the lower winding of relay 1312 which releases relay 1305. Relay 1305 in turn releases relays 1304, 1307, 1302, 1303 and 1306 thereby restoring the local end of the trunk to normal.

The release of relay 1306 reverses the connection of relay 1305 to the interoffice trunk, releasing polarized relay 1312 which in turn releases relays 1310, 1309 and 1313, disconnecting relay 1312 from the trunk and completing the restoration of the trunk to normal.

Relay 720 opens the locking circuit of relay 713 and, when the operator restores key 716, relays 723, 717 and 713 release. The release of relay 713 disconnects battery through resistance 715 from the winding of relay 602 and the sleeve of plug 629 and restores its connection to relay 601.

Relay 533, therefore, reoperates, shunting relay 542 which disconnects battery and ground from repeating coil 527 and restores the connection with relay 526. It also restores relay 543 to the control of relay 526. With battery removed from the toll end of the trunk, relay 510 releases, in turn releasing relay 521 which opens the number checking connection.

The toll operator may now complete the connection or take appropriate action in the usual manner.

What is claimed is:

1. In a telephone system, a subscriber's line having a test terminal, automatic switches for establishing telephone connections with said subscriber's line, an operator's position, a connection established from said subscriber's line to said operator's position, control equipment common to said switches for directing the operation thereof, means under the control of said operator's position to seize said control equipment and means in said control equipment, responsive to seizure by said operator's position and registration of the number of said subscriber's line, to connect a checking current to said established connection over said test terminal.

2. In a telephone system, a subscriber's line having a test terminal, automatic switches for establishing telephone connections with said subscriber's line, an operator's position, a connection established from said subscriber's line to said operator's position, control equipment common to said switches for directing the operation thereof, means under the control of said operator's position to seize said control equipment, means in said control equipment, responsive to seizure by said operator's position and registration of the number of said subscriber's line, to connect a checking current to said established connection over said test terminal, and means in said control equipment, connected with said established connection at said operator's position and responsive to the current connected thereto to transmit a signal to said operator position.

3. In a telephone system, a subscriber's line having a test terminal, automatic switches for establishing telephone connections with said subscriber's line, an operator's position, a connection established from said subscriber's line to said operator's position, equipment for controlling said switches, means under the control of said operator's position to seize said control equipment, means in said control equipment normally responsive to the registration of the number of said subscriber's line for testing the condition of said test terminal and effective if said line is idle to control said switches to establish a connection with said line and means, responsive to the seizure of said control equipment by said operator's position, to cancel said switch controlling operation and to connect a checking current to said established connection over said test terminals.

4. In a telephone system, a subscriber's line having a test terminal, automatic switches for establishing telephone connections with said subscriber's line, an operator's position, a connection established from said subscriber's line to said operator's position, equipment for controlling said switches, means under the control of said operator's position to seize said control equipment, means in said control equipment normally responsive to the registration of the number of said subscriber's line for testing the condition of said test terminal and effective if said line is idle to control said switches to establish a connection with said line, means responsive to the seizure of said control equipment by said operator's position, to cancel said switch controlling operation and to connect a checking current to said established connection over said test terminal, and other means in said control equipment, connected with said established connection and responsive to the current connected thereto to transmit a signal to said operator's position.

5. In a telephone system, a plurality of lines serving one subscriber, each line having a test terminal, automatic switches for establishing telephone connections with said line, an operator's position, a connection established from one of said lines to said operator's position, equipment for controlling said switches, means under the control of said position to seize said control equipment, and means in said control equipment, responsive to seizure by said operator's position to simultaneously connect a current to the test terminals of all of said plurality of lines individually.

6. In a telephone system, a plurality of lines serving one subscriber, each line having a test terminal, automatic switches for establishing telephone connections with said line, an operator's position, a connection established from one of said lines to said operator's position, equipment for controlling said switches, means under the control of said position to seize said control equipment, and means in said control equipment, responsive to seizure by said operator's position to simultaneously connect a current to the test terminals of all of a plurality of said lines individually, receiving means in said control equipment, connected with said established connection and responsive to the current connected thereto, and means under the control of said receiving means to cause the connection of said current to the test terminals of additional pluralities of said lines until said current has been connected to all of said lines.

7. In a telephone system, a subscriber's line having a test terminal, automatic switches for establishing telephone connections, an operator's position, a connection established from said subscriber's line to said operator's position, a second operator's position, means for connecting said operators' positions, equipment for controlling said switches, means under the control of said second operator's position to seize said control equipment, and means in said control equipment responsive to seizure by said second operator's position and the registration of the number of said subscriber's line to connect a checking current to said established connection over said test terminal.

8. In a telephone system, a subscriber's line having a test terminal, automatic switches for establishing telephone connections, an operator's position, a connection established from said subscriber's line to said operator's position, a second operator's position, means for connecting said operators' positions, equipment for controlling said switches, means under the control of said second operator's position to seize said control equipment, means in said control equipment responsive to seizure by said second operator's position and the registration of the number of said subscriber's line to connect a checking current to said established connection over said test terminal, and means in said control equipment connected with said established connection, and responsive to the current connected thereto to transmit a signal to said first operator's position.

9. In a telephone system, a subscriber's line at one office having a test terminal, automatic switches at said office for establishing telephone connections, an operator's position at a second office, an interoffice trunk, a connection established from said subscriber's line to said operator's position over said interoffice trunk, a second operator's position at said first office, means for connecting said operators' positions, equipment for controlling said switches, means under the control of said second operator's position to seize said control equipment, means in said control equipment responsive to seizure by said second operator's position and the registration of the number of said subscriber's line to connect a checking current to said established connection over said test terminal, and means in said control equipment connected with said interoffice trunk at said first office, and responsive to the current connected thereto to transmit a signal to said first operator's position.

FRANKLIN A. KORN.